March 19, 1935.  G. E. HOWARD  1,995,276

GLASS WORKING APPARATUS AND METHOD

Filed Oct. 21, 1931  16 Sheets-Sheet 1

Witness:
W. B. Thayer

Inventor:
George E. Howard
by Brown & Parham
Attorneys

March 19, 1935.  G. E. HOWARD  1,995,276
GLASS WORKING APPARATUS AND METHOD
Filed Oct. 21, 1931  16 Sheets-Sheet 5
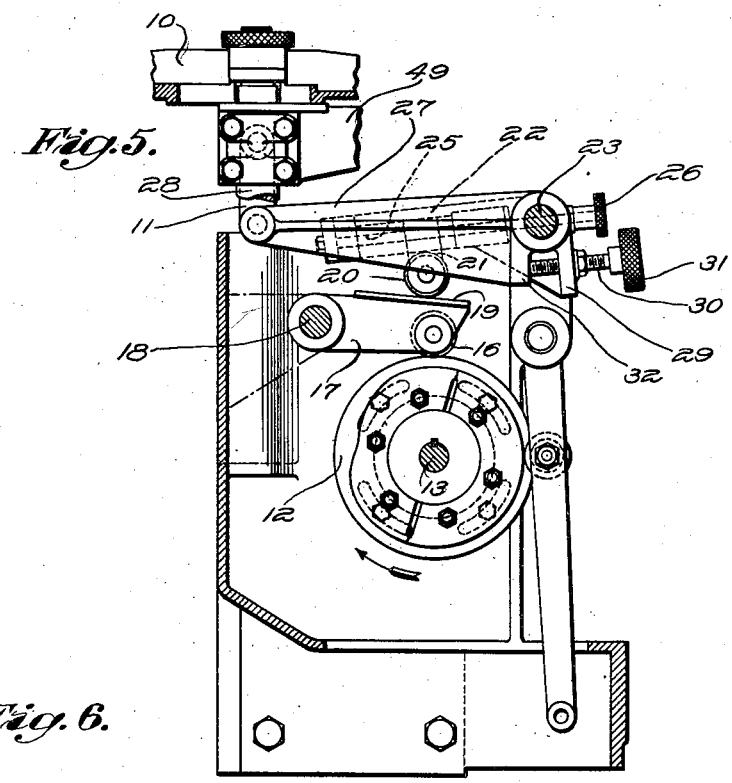
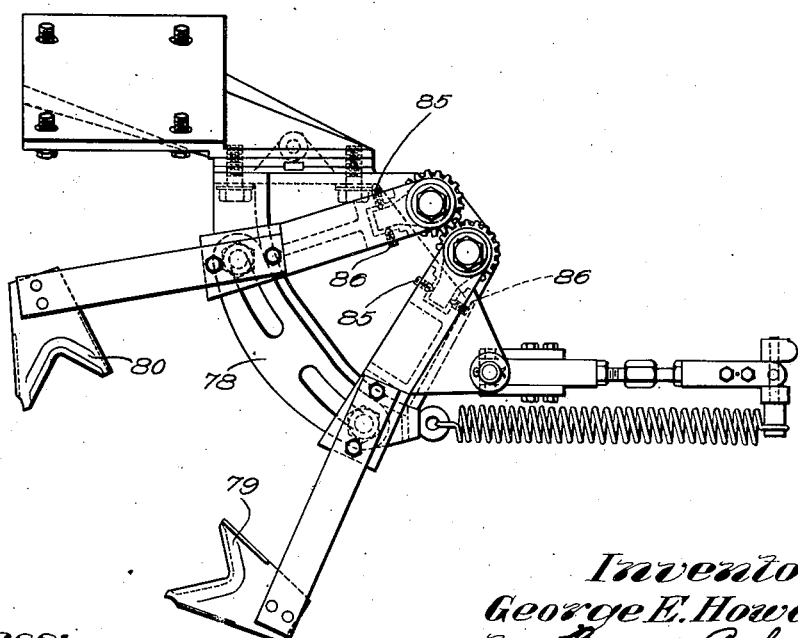
Witness;
W. B. Thayer,
Inventor;
George E. Howard
by Brown & Parham
Attorneys March 19, 1935.  G. E. HOWARD  1,995,276
GLASS WORKING APPARATUS AND METHOD
Filed Oct. 21, 1931   16 Sheets-Sheet 6

Witness:
W. B. Thayer

Inventor:
George E. Howard
by Brown & Parham
Attorneys

March 19, 1935.  G. E. HOWARD  1,995,276
GLASS WORKING APPARATUS AND METHOD
Filed Oct. 21, 1931  16 Sheets-Sheet 7
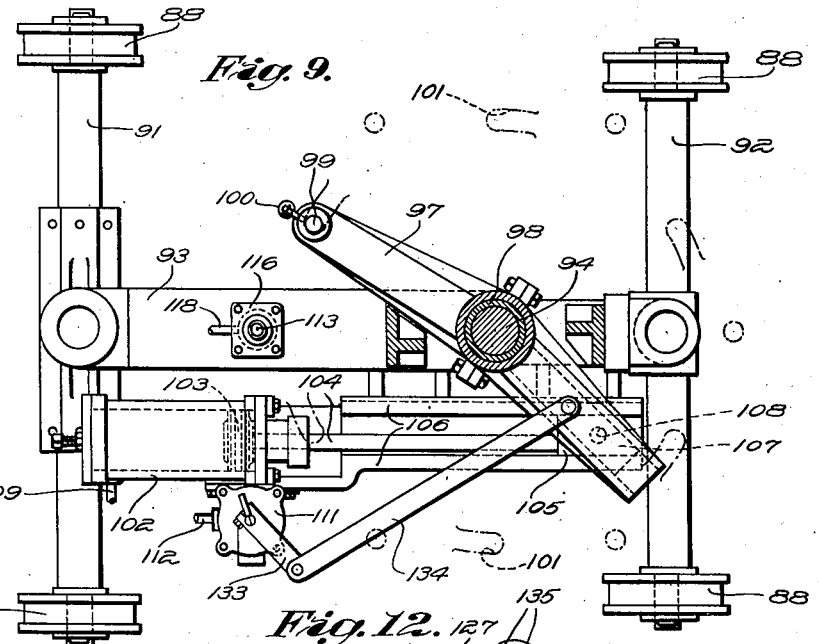
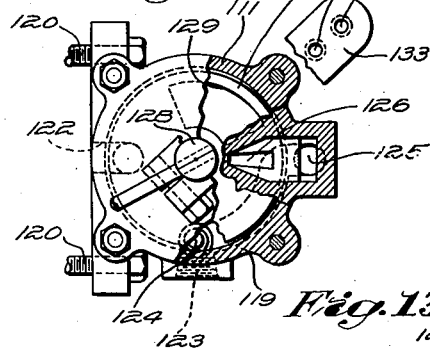
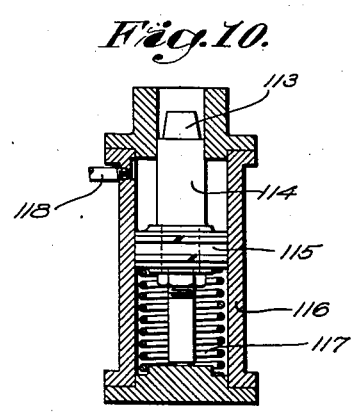
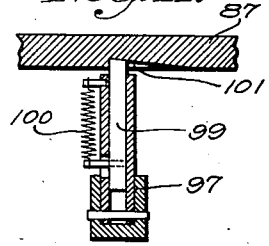
Witness:
W. B. Thayer
Inventor:
George E. Howard
by Brown & Parham
Attorneys March 19, 1935.   G. E. HOWARD   1,995,276
GLASS WORKING APPARATUS AND METHOD
Filed Oct. 21, 1931   16 Sheets-Sheet 8

Witness:
W. B. Thayer

Inventor;
George E. Howard
by Brown & Parham
Attorneys

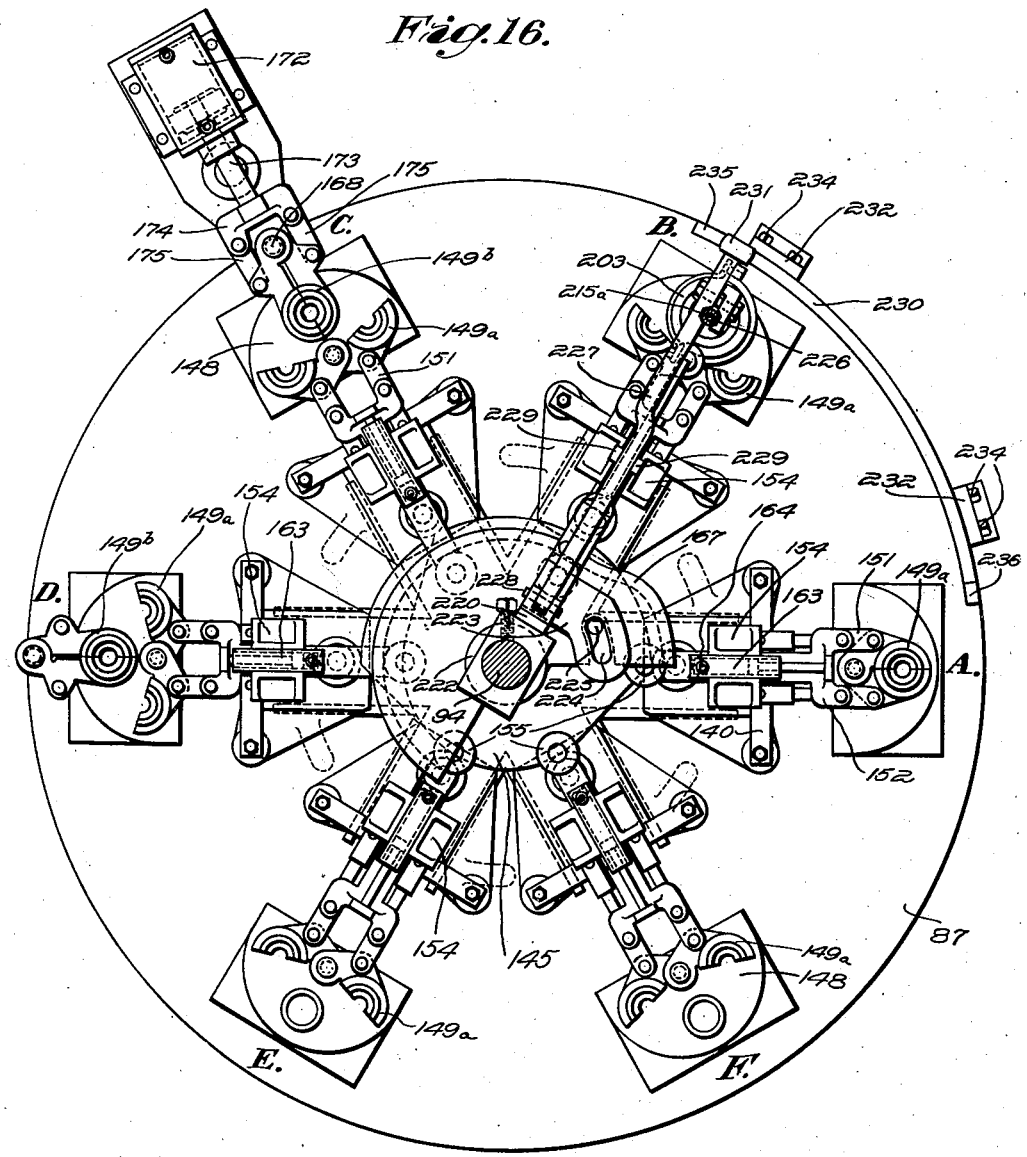

March 19, 1935.  G. E. HOWARD  1,995,276
GLASS WORKING APPARATUS AND METHOD
Filed Oct. 21, 1931  16 Sheets-Sheet 10
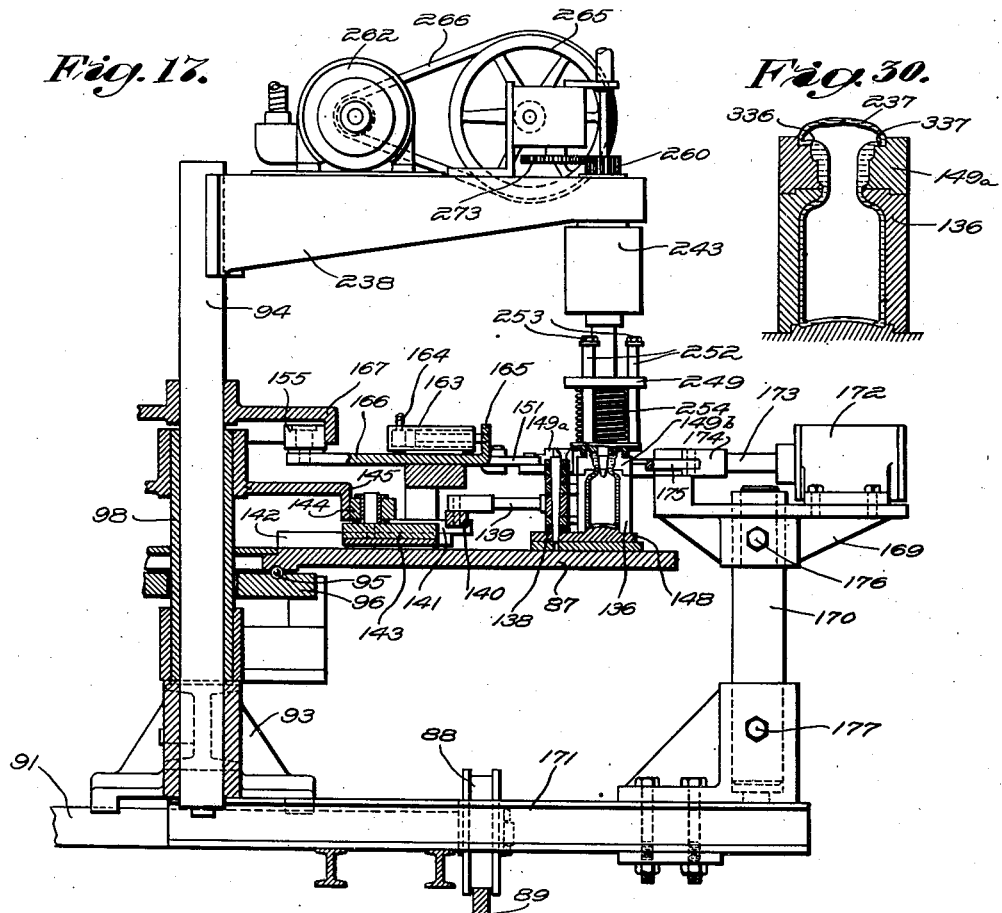
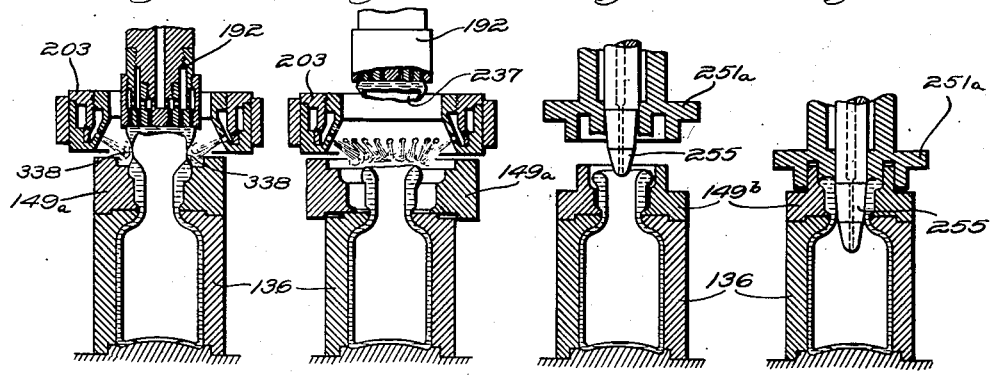

March 19, 1935.  G. E. HOWARD  1,995,276
GLASS WORKING APPARATUS AND METHOD
Filed Oct. 21, 1931  16 Sheets-Sheet 11
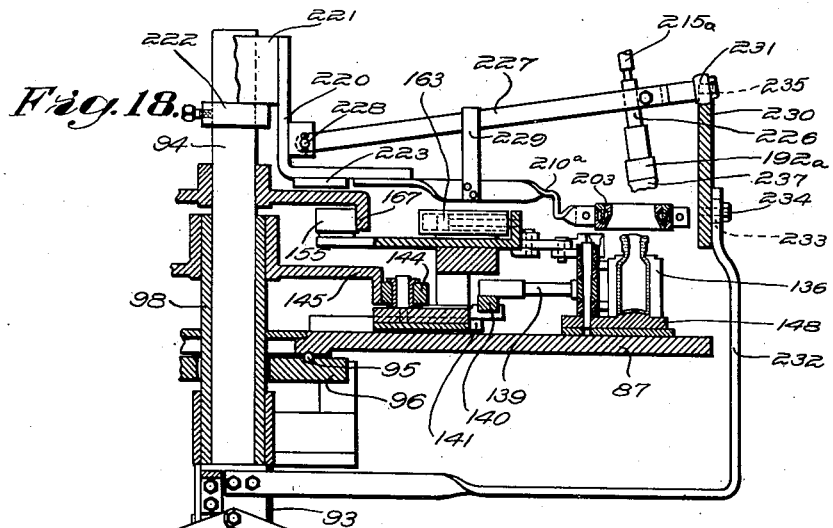
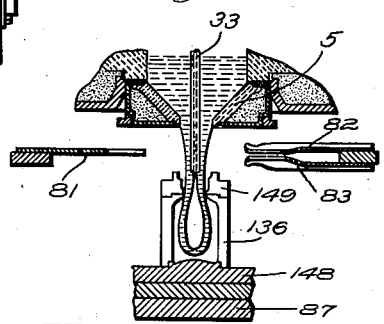
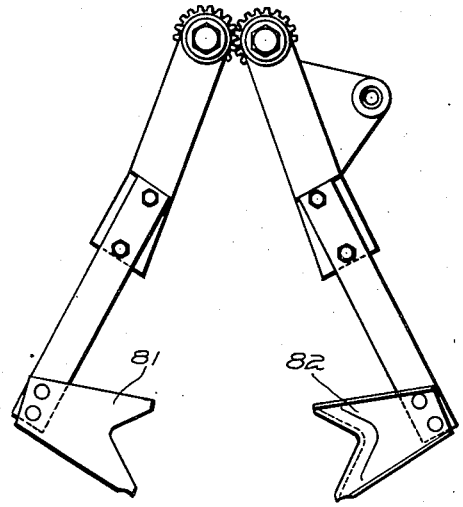
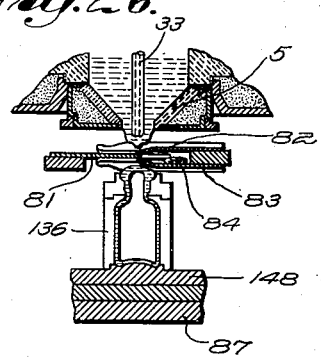
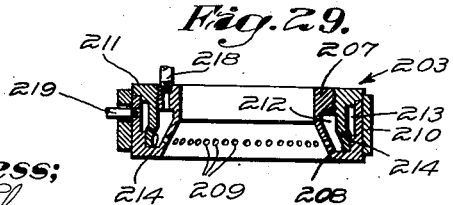
Inventor;
George E. Howard
By Brown & Parham
Attorneys
Witness;
W. B. Thayer March 19, 1935.  G. E. HOWARD  1,995,276
GLASS WORKING APPARATUS AND METHOD
Filed Oct. 21, 1931  16 Sheets-Sheet 12

Witness:
W. B. Shaser

Inventor:
George E. Howard
by Brown + Parham
Attorneys

March 19, 1935.  G. E. HOWARD  1,995,276
GLASS WORKING APPARATUS AND METHOD
Filed Oct. 21, 1931  16 Sheets-Sheet 13
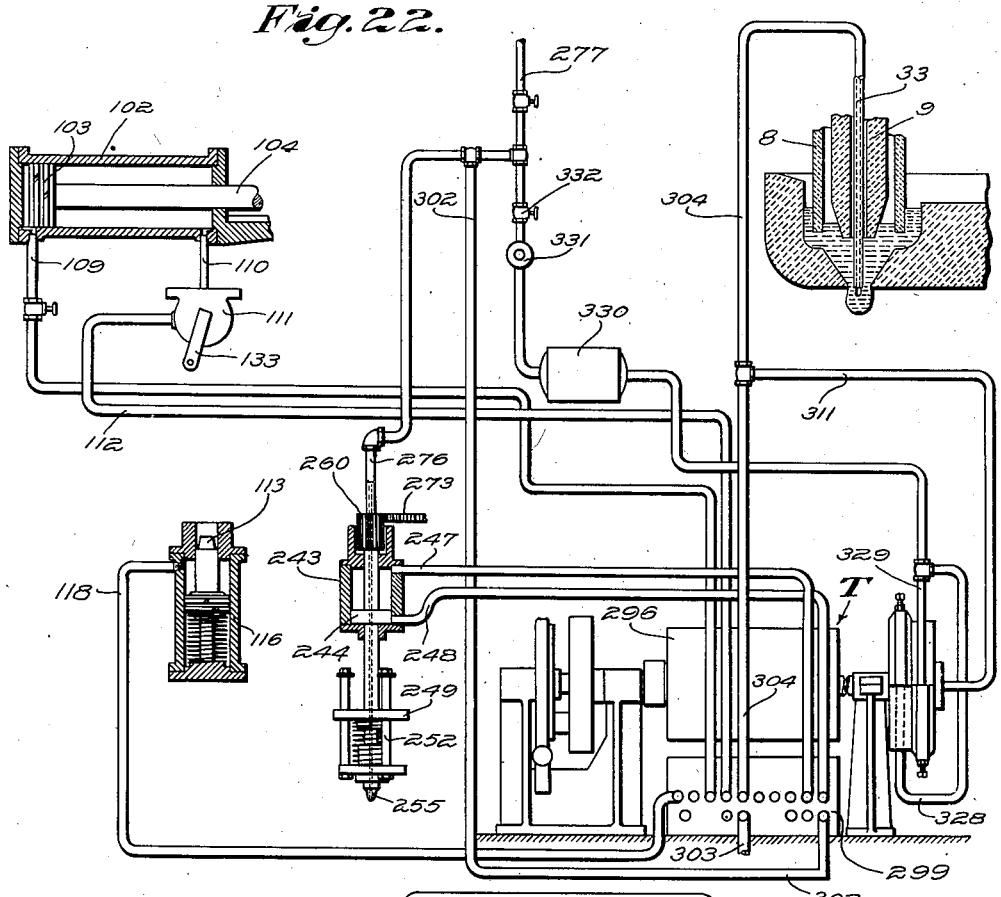
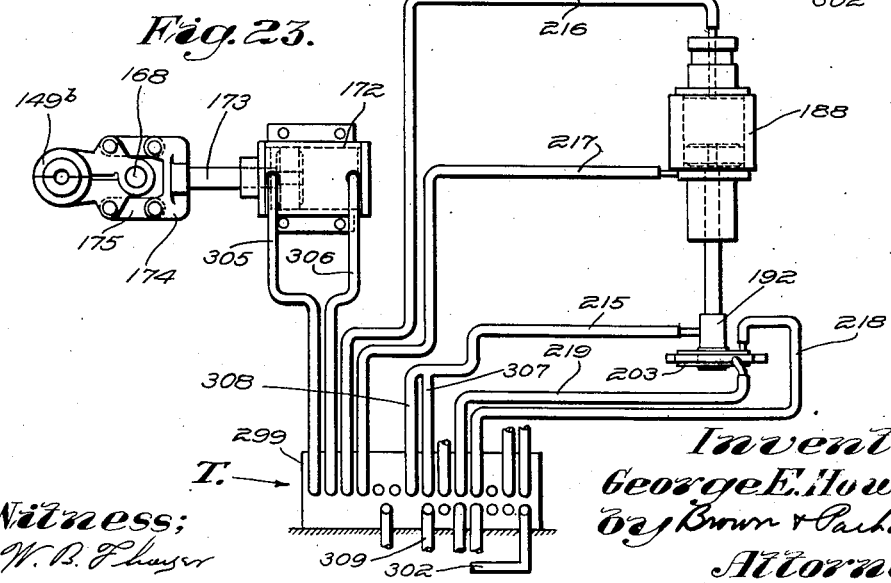

March 19, 1935.                G. E. HOWARD                1,995,276
                   GLASS WORKING APPARATUS AND METHOD
                       Filed Oct. 21, 1931      16 Sheets-Sheet 14
Fig.35.        Fig.36.        Fig.37.        Fig.38.
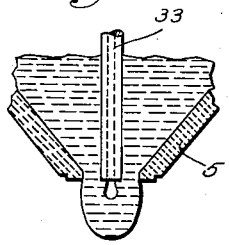 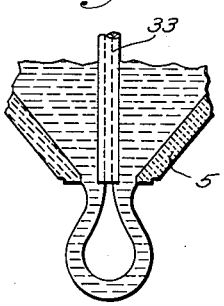 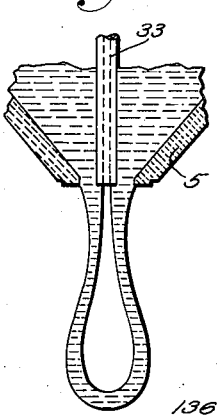 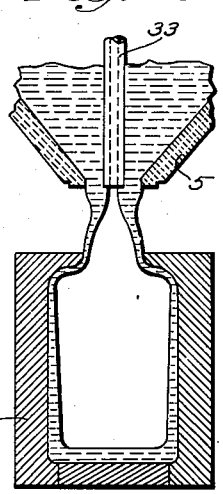
Fig.39.        Fig.40.        Fig.41.        Fig.42.
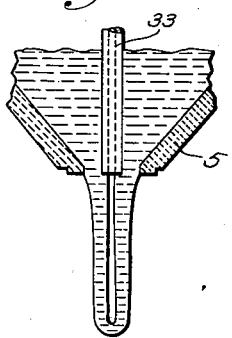 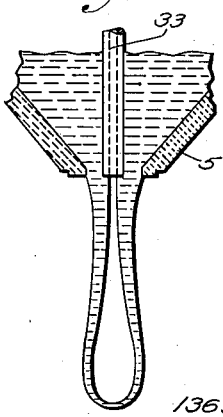 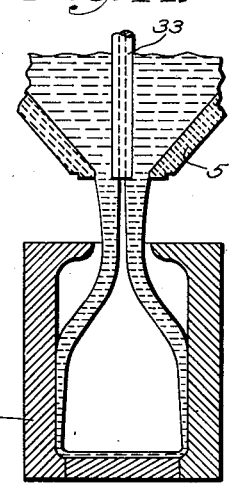 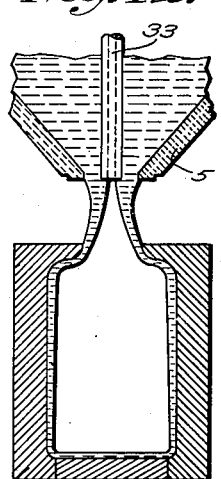
Inventor:
George E. Howard
by Brown & Parham
Attorneys
Witness;
W. B. Thayer March 19, 1935. G. E. HOWARD 1,995,276
GLASS WORKING APPARATUS AND METHOD
Filed Oct. 21, 1931 16 Sheets-Sheet 15
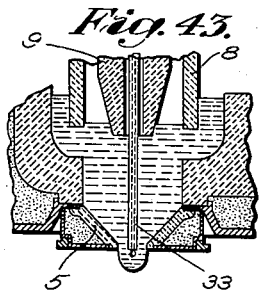
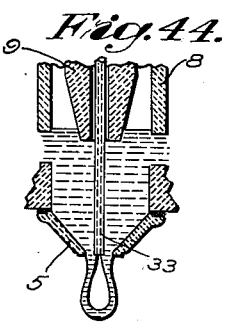
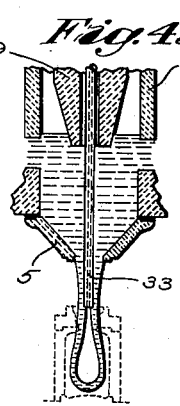
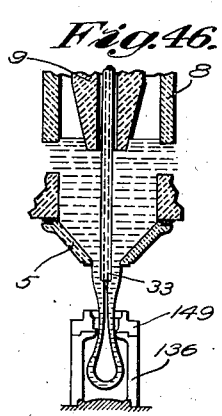
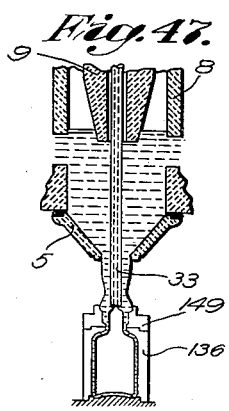
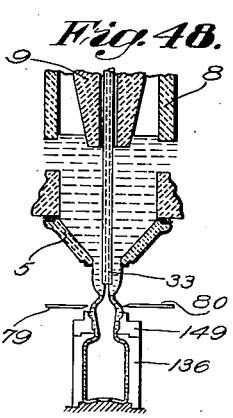
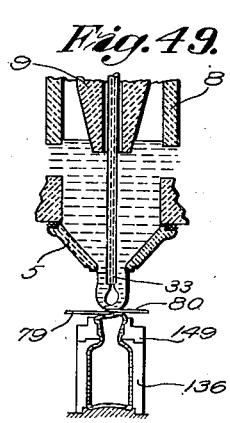
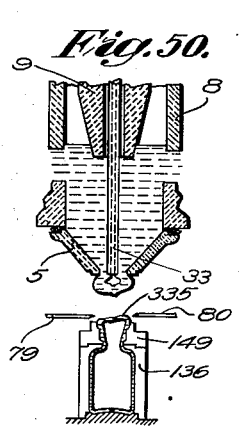
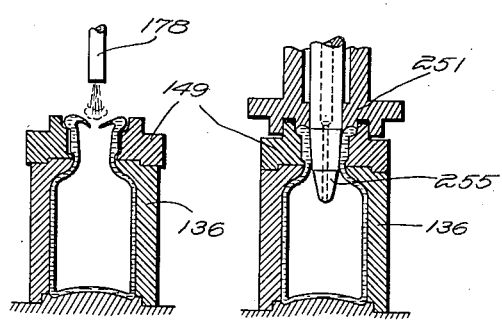

March 19, 1935.                G. E. HOWARD                 1,995,276
                    GLASS WORKING APPARATUS AND METHOD
                    Filed Oct. 21, 1931      16 Sheets-Sheet 16
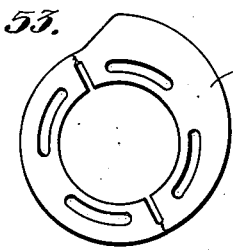
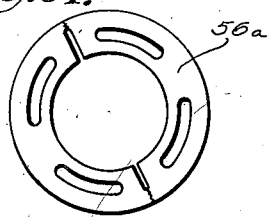
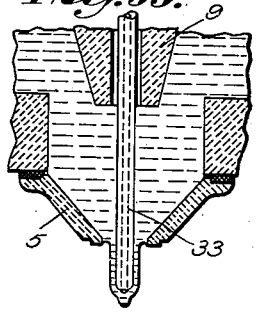
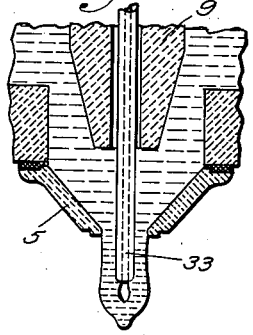
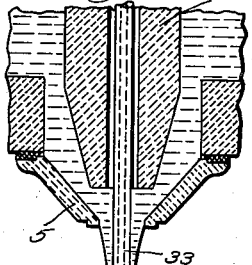
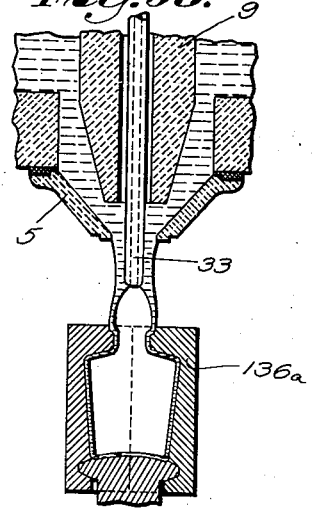
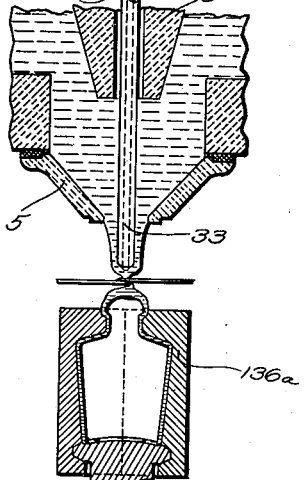
Inventor;
George E. Howard
by Brown & Parham
Attorneys
Witness;
W. B. Thayer.

Patented Mar. 19, 1935

1,995,276

UNITED STATES PATENT OFFICE 1,995,276

GLASS WORKING APPARATUS AND METHOD

George E. Howard, Butler, Pa., assignor to Hartford-Empire Company, Hartford, Conn., a corporation of Delaware Application October 21, 1931, Serial No. 570,087

28 Claims. (Cl. 49—5)

This invention constitutes an improvement upon my prior Patent 1,592,299, which patent describes and claims a novel method of forming glassware which I prefer to call the "auto-blow" method. This "auto-blow" method consists essentially in developing a preliminary hollow body of glass while the glass of the body is still attached to a source of supply of molten glass, receiving that body of glass in a suitable mold, blowing it to final form therein; and in those cases in which the article to be made requires a neck finish, thereafter treating the article in the mold in such a way as to form such finish.

In adapting the broad method of my aforesaid patent to the commercial necessities of the glass trade, I have made certain important discoveries relating to the control of the thickness of various portions of the developed bubble of glass, to the end that when the article is completed, it has the desired distribution of glass both vertically and horizontally.

The problem of good distribution in the practice of my "auto-blow" process is intimately associated with the reduction in the amount of glass required to make a bottle or other article of requisite strength and capacity. For a given purpose a bottle must have a minimum resistance to rupture, which resistance in a particular bottle is only the resistance of the weakest portion thereof. I have found that one of the particular advantages of the "auto-blow" method is that by proper control and coordination of the several instrumentalities used, bottles and other articles of requisite strength may be obtained with a minimum of glass.

Thus, an object of the present invention is to provide means for and methods of control of the characteristics of the glass prior to and during article formation, which permit accurately controlled, fully automatic production of a shaped glass bubble, the reception of that bubble at the proper instant in a mold, and the blowing thereof into an article having walls of selected and controlled thickness.

A further object of the invention is to provide a process and an organized automatic means for carrying out that process, which includes not only the development of the shaped bubble of glass and the blowing of the same in a mold, but also the finishing of the neck portion of the article when desired.

More specific objects of the invention reside in the provision of novel means for separating or severing the bubble of glass from the source of supply of molten glass, which is peculiarly advantageous in the practice of the "auto-blow" process and which assures that the glass both above and below the severing means is in proper condition for further operations after each severing operation.

Other and more detailed objects of the present invention as well as combinations and sub-combinations of the above named objects are comprehended by the present invention and will become apparent from a reading of the following specification.

In the accompanying drawings, I have fully illustrated one embodiment of mechanism necessary to the performance of the aforegoing objects, many parts of which, per se, exist in the prior art, but which have never before to my knowledge, been so combined and used for the purposes or to obtain the results for which they are intended in the embodiment herein shown.

In the drawings:

Fig. 5 is a detail view with certain parts in section showing certain portions of the plunger and shear operating means;

Fig. 6 is a detailed view of certain portions of the shear mounting and operating structure;

Fig. 9 is a plan view with some parts in horizontal section of the means for intermittently rotating the table of the machine;

Fig. 10 is a view in vertical section of the table locking device;

Fig. 11 is a vertical sectional view showing the table rotating pin and a portion of the table;

Fig. 12 is a plan view partially broken away and in horizontal section of the cushioning valve of the operating cylinder for the table;

Fig. 13 is an elevation with parts in vertical section of the valve shown in Fig. 12;

Fig. 16 is a plan view of a modified form of the machine portion of the device;

Fig. 17 is an elevational view with parts in vertical section showing the operation of the form of the device shown in Fig. 16;

Fig. 18 is an elevational view with parts in vertical section of a portion of the construction shown in Fig. 16 showing particularly the operation of the traveling "pick off" and burner;

Fig. 22 is a piping diagram of the feeder portion of the device shown in Figs. 1 to 6 and the machine as shown in Fig. 7;

Fig. 23 shows certain modifications of the piping diagram of Fig. 22 applicable for use with the modified form of the machine portion of the device shown in Fig. 16;

Fig. 24 (Sheet 11) is a plan view of the modified form of shear mechanism for simultaneously severing glass at two vertically spaced points;

Figs. 25 and 26 are views substantially in vertical section showing the use of the shear mechanism of Fig. 24;

Fig. 29 (Sheet 11) is a detail in vertical section of an annular burner which may be used in connection with either the fixed or traveling "pick off";

Figs. 30 to 34 inclusive (Sheet 10) show various stages of the process by which the "pick off" method of forming a neck opening into the interior of an article produced by the "auto blow" process may be carried out, Figs. 33 and 34 also disclosing the use of a secondary neck ring of different size than the primary neck ring shown in Figs. 30 to 32 inclusive;

Figs. 35 to 38 (Sheet 14) show the development of a bubble of glass to produce an article having a relatively thin top and relatively thick bottom;

Figs. 39 to 42 show the development of a bubble of glass to produce an article having a relatively thin bottom and a relatively thick top;

Figs. 43 to 52 inclusive show the various process stages in the formation of an article by the "auto blow" process in which vertical movement is imparted to a blow pipe and the plunger and sleeve are retained stationary;

Figs. 53 and 54 show the contour of certain cams for the plunger and blow pipe respectively by which the plunger may be moved while the blow pipe is retained stationary; and Figs. 55 to 59 inclusive show steps of the formation of an article by the "auto-blow" process in which the article is produced by holding the blow pipe stationary and moving the plunger, as will be accomplished by the use of cams shown in Figs. 53 and 54.

FEEDER PORTION OF THE DEVICE

The feeder portion of the device, best illustrated in Figs. 1 to 4 inclusive, comprises essentially a modification of the forehearth, bowl and mechanism of Peiler Patent 1,760,254, granted May 27, 1930, to which patent reference is made for a description of common subject matter, applicant contenting himself in the structural description in pointing out the essential features of difference between his device and that of the Peiler patent.

The forehearth and feeder bowl may, if desired, be identical with that shown in the Peiler patent. But as is indicated, particularly in Figs. 3 and 4, I prefer to modify the glass containing portion of the bowl of the Peiler patent to provide a "divided stream flow" of glass to the outlet somewhat similar to that of my prior Patent 1,553,819, granted September 15, 1925.

To this end, I provide an island 1 of the configuration shown, which divides the stream of glass and causes it to flow into a cup 2 from several sides. Also I prefer the arrangement shown including the cup 2 to the arrangement shown in the Peiler patent.

Figure 3:
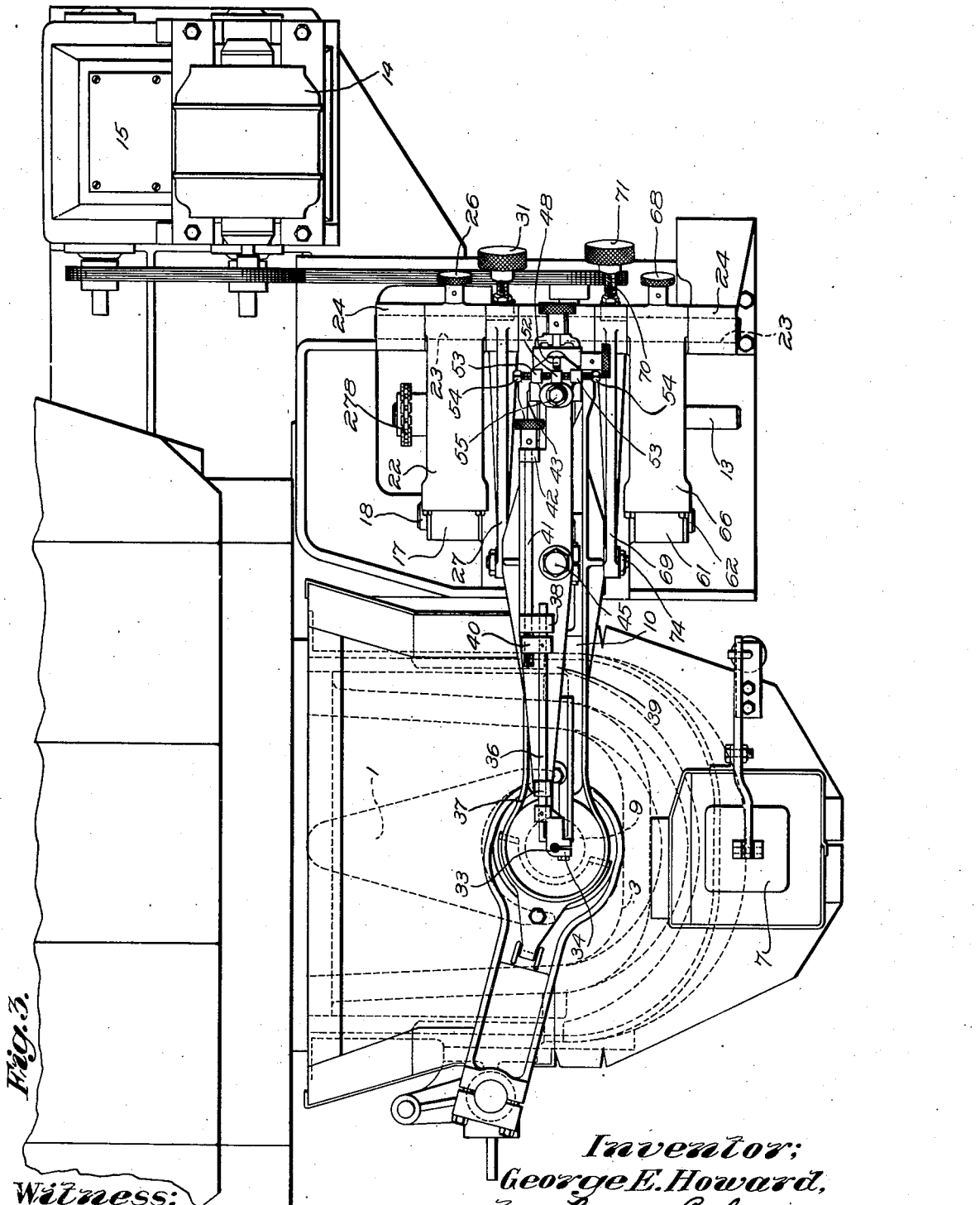
Fig. 3 is a plan view of the structure shown in Fig. 2.

In the preferred embodiment of my invention shown more particularly in Fig. 3, the extreme forward glass contacting wall of the feeder bowl is somewhat flattened, as indicated at 3, whereby the separated streams of glass after passing the island 1 will be caused to converge rapidly as they approach the discharge outlet at the forward end of the feeder bowl. Such a provision has been found to assure axially symmetrical viscosity conditions of the glass issuing from the outlet. The glass is thus directed from several sides, first into the cup-like bowl 2, thence downwardly through the well 4 through interchangeable orifice ring 5. Also in the preferred embodiment of my invention, I substitute for the rearwardly positioned stack 113 of Peiler a forward stack 6 provided with the adjustable damper 7, whereby more efficiently to provide a rising temperature gradient toward the forward end of the bowl when desired. However, this result may be sufficiently obtained by using the identical heating and draft control means of the Peiler patent. Also if desired, I may furnish both stacks and use them selectively.

If desired, the hydrostatic head over the orifice may be regulated as in the Peiler patent, but I prefer to regulate such head, and hence the average rate at which glass issues from the orifice in a given period of time, by a stationary but adjustable sleeve or tube 8, the lower end of which depends a regulable distance into the cup 2 and acts with the walls of that cup to regulate the size and resistance of the flow passage for the glass. Except for the arrangement above mentioned, this sleeve or tube may be formed, mounted and adjusted by mechanism in every way identical with that shown in the aforesaid Peiler patent, although equivalent mechanism may be substituted therefor if desired.

Adjustably mounted for selected axial reciprocating motion, or if desired for adjustable stationary use within the sleeve 8 is a discharge controlling member or plunger 9, the member and its mounting being somewhat similar to the plunger 172 of the aforesaid Peiler patent, except that it is provided with an axial bore for the blow pipe hereinafter to be described, and except that the mechanism for operating it (see Fig. 5), either as a reciprocating implement or as a stationary control member, differs from the Peiler arrangement.

The plunger 9 is carried by an arm 10 which is mounted, guided and adjusted by means such as is shown in the Peiler patent, and is provided with an actuating link 11 (Fig. 5) corresponding to the link 224 of the Peiler patent, through which vertical reciprocation may be imparted to the plunger. The plunger is preferably provided as shown with means providing for all of the static adjustments of the Peiler device, including vertical positioning and lateral positioning universally in a horizontal plane.

The means for driving the plunger (see Figs. 1, 2 and 5) comprises a cam 12 mounted on a shaft 13 driven from an electric motor 14 through a suitable speed changing device 15. The cam 12 comprises a pair of complementary semi-circular lobe sections which are fastened by means of the bolt and nut arrangement shown to a suitable hub keyed to the shaft 13. This arrangement permits the cam to be angularly adjusted about the cam shaft and permits ready interchangeability of cams when it is desired to obtain different plunger action. A cam of different shape for imparting a different motion to the plunger 9 is shown at 12ᵃ in Fig. 53. This mechanism for adjusting the plunger action is simpler and less expensive than that of the Peiler patent, but obviously, if desired, the Peiler patent construction could be substituted therefor.

Cooperating with the cam 12 (Fig. 5) is a cam roller 16 mounted upon the free end of the lever 17 pivoted at 18 to a fixed part of the apparatus, the lever 17 having a roller-engaging face 19 on its upper side. On the face 19 rests a roller 20, which is in effect a cam roller, the roller 20 being mounted upon a suitable supporting block 21 mounted for adjustive movement longitudinally of the lever 22. The lever 22 is pivoted upon a rocker shaft 23 mounted in bearings 24 (Fig. 3) secured to a suitable fixed part of the apparatus. Means are provided for adjusting the block 21 longitudinally of the lever 22 comprising a shaft 25 swivelly mounted in and extending longitudinally of the lever 22 and provided at its outer end with a head 26, the shaft 25 being threaded in the block 21. Thus, rotation of the head 26 will adjust the roller 20 toward and away from the axis of the shaft 23 and thereby vary the amount the lever 22 is swung about its axis by a given rise or fall of the cam 12.

Also mounted upon the shaft 23 is a lever 27, which is connected at its outer end to the hollow shaft 28 by the link 11. The lever 22 is provided with a laterally and downwardly extending bracket portion 29 into which is adjustably threaded a screw 30 provided with a head 31, the inner end of the screw 30 bearing against a shoulder 32 on the lever 27. Thus, motion is imparted from the cam roller 16 through the lever 17, cam roller 20 and lever 22 to the lever 27, and thence through link 11 and the vertical hollow shaft 28 to arm 10 and the plunger 9 secured thereto.

Thus, the plunger, in addition to the static adjustments as to its lateral position with respect to the orifice referred to above, is provided with a plurality of adjustments effecting the characteristics of its movements. In the first place, the range or positions of the stroke, that is the positions of the upper and lower limits of the stroke of the plunger, are adjusted simultaneously by the set screw 31 which determines the relation between levers 22 and 27 without varying the amplitude of the stroke or the form of its movement, by which latter is meant a movement which might first accelerate faster, then vary the acceleration, then reverse direction and vary the acceleration and/or deceleration in the other direction. Second, the amplitude of the stroke of the plunger, that is the distance between the upper and lower limits of the stroke, may be adjusted by turning the head 26 to vary the distance between the axis of the roller 20 and the shaft 23, so that a given rise or fall of the cam 12 will move the plunger up or down a different amount. Also the form of the movement of the plunger stroke may be varied by interchanging cams 12. So, for example, a cam such as is shown in Fig. 5 may be used, all portions of the periphery of which are at a fixed distance from the center of the shaft 13, whereby the plunger will have a zero stroke or amplitude.

On the other hand, a cam such as is shown in Fig. 53 at 12ᵃ may be used, all parts of the periphery of which are not at the same distance from the center, so that the plunger will have an up-and-down movement with respect to the orifice. In addition, assuming that the cam such as is shown at 12ᵃ in Fig. 53 be used, it is possible to adjust this cam angularly about the shaft 13, whereby the position of the rise and fall of the plunger stroke with respect to the time of other operations of the device, hereinafter to be described, may be varied, which adjustment may be known as a "phase" adjustment. Any and all of these adjustments may be employed in the operation of my device.

*Blow pipe, construction, mounting and operation (Figs. 1 to 4)*

Figure 4:
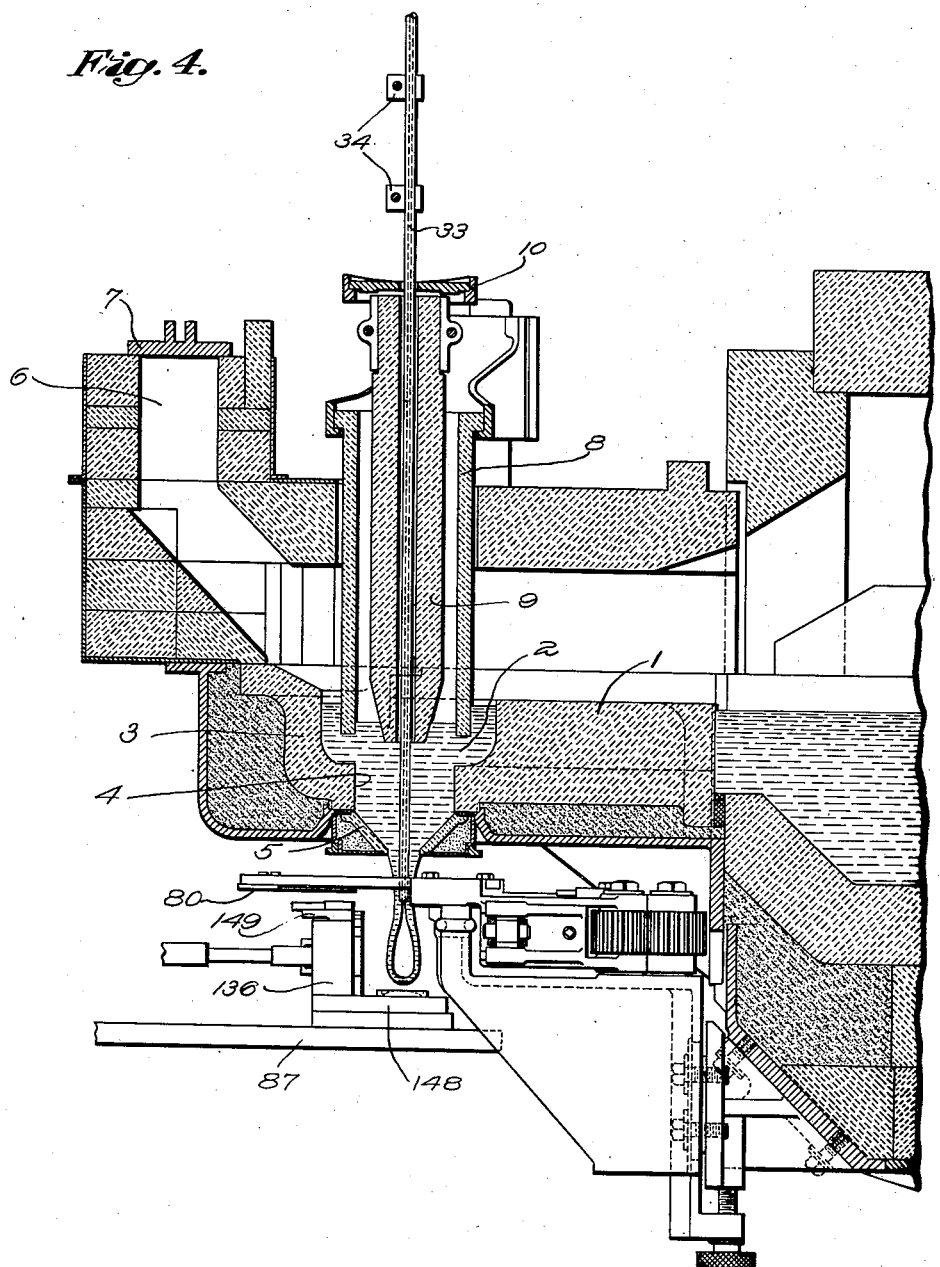
Fig. 4 is a vertical section taken substantially on the line 4—4 of Fig. 2.

In the "auto-blow" device shown herein, there is provided means for supplying air downwardly through the orifice to develop a bubble of glass thereunderneath. This means, in practice, may take the form of the blow pipe extending downward substantially axially of the plunger and sleeve and disposed substantially in vertical axial alignment with the orifice and depending into the glass. Such a blow pipe is shown at 33 (Fig. 4). Means must also be provided for supporting the blow pipe and, if desired, for moving it in a substantially similar manner to that hereinbefore described for supporting and moving the plunger, but independent of such means. As with the plunger, it is contemplated that the movement of the blow pipe may, and in certain instances does, include zero movement.

Figure 1:
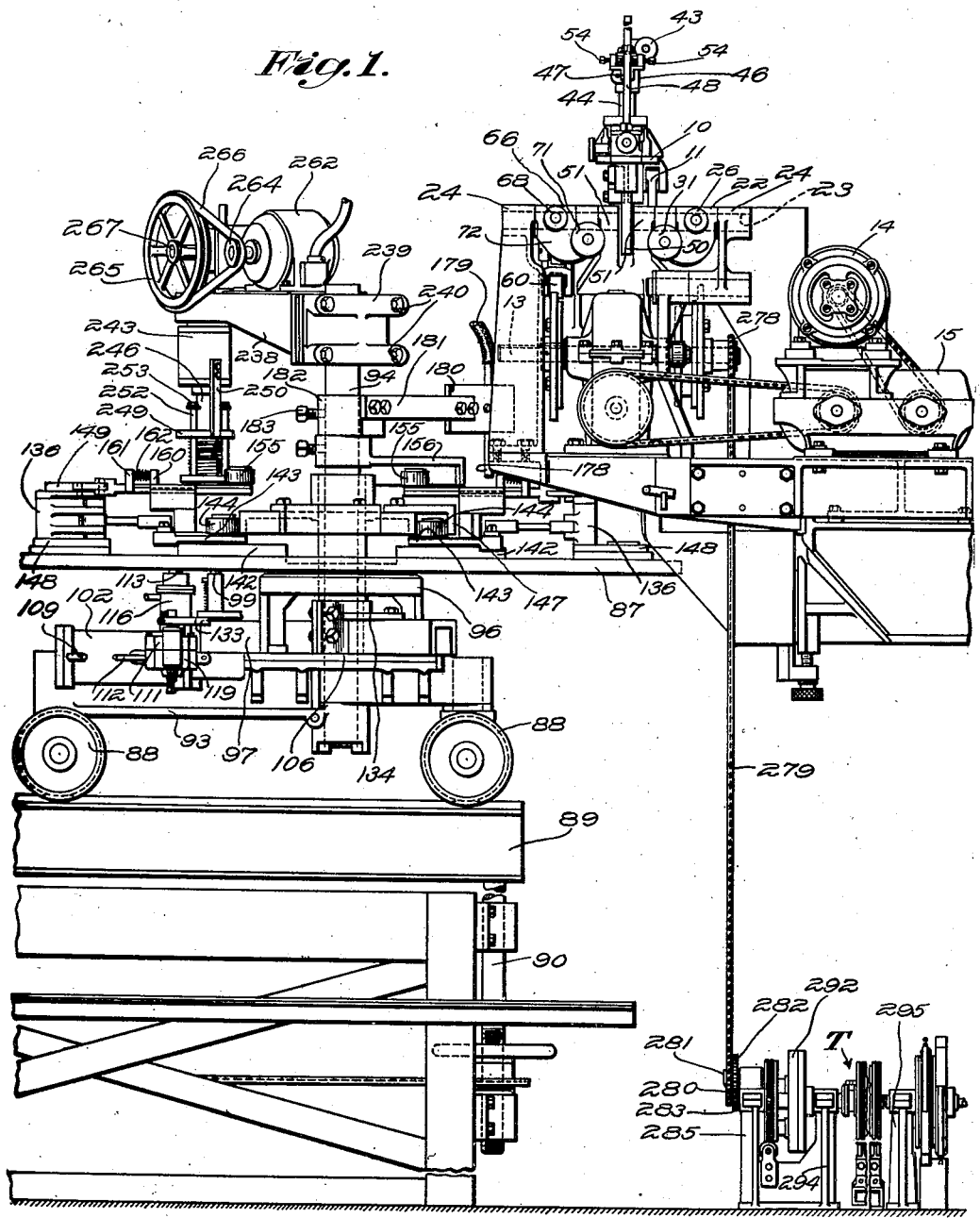
Figure 1 is a side elevation of one embodiment of the entire device.
Figure 2:
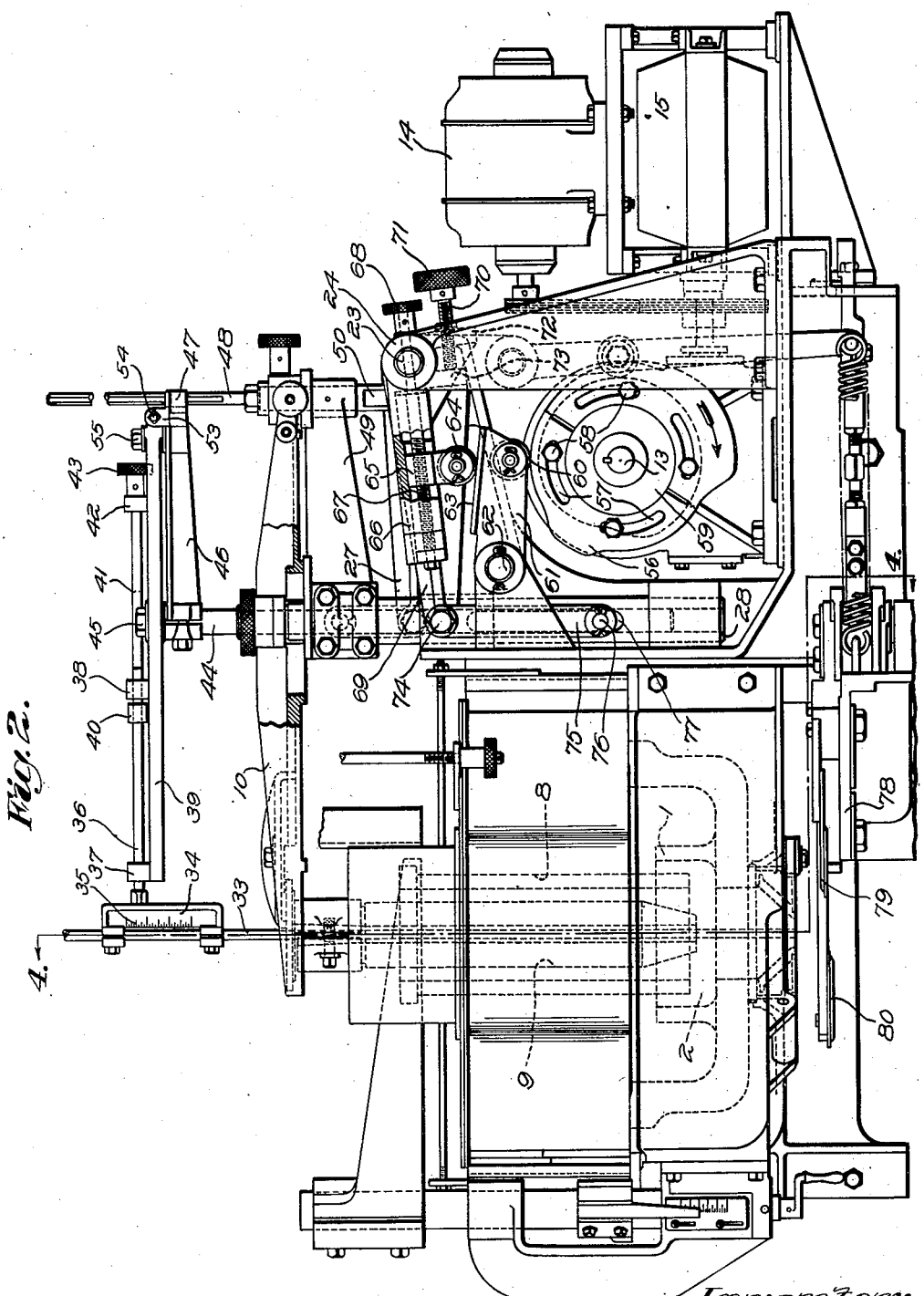
Fig. 2 is a front view on a larger scale of the feeder portion of the device.

As shown in Figs. 1 to 4, and particularly in Fig. 2, the blow pipe is clamped in a split bracket 34. The bracket 34 is preferably provided with a scale shown at 35 (Fig. 2) which may cooperate with a suitable index mark (not shown) on the blow pipe, so that the position of the blow pipe may be readily ascertained.

Referring now to Figs. 2 and 3, the bracket 34 is shown suitably secured to a laterally extending shaft 36 which is slidably mounted in bearings 37 and 38 integral with or secured to a horizontal arm 39.

Means are provided for adjusting the position of the shaft 36 longitudinally of the arm 39, such means comprising a bracket member 40 pinned or otherwise suitably secured to the shaft 36 and provided with a threaded aperture through which extends the threaded end of a shaft 41 swivelly mounted in the brackets 38 and 42 on the arm 39 and provided with an adjusting head 43.

Means are provided for supporting the arm 39 for vertical reciprocation comprising a shaft 44 mounted for vertical reciprocation within the hollow shaft 28 which supports the plunger arm 10. The arm 44 is provided with a reduced threaded end passing through an aperture in the arm 39 and provided with a nut 45 at its top to clamp the arm 39 to the shaft 44. For the purpose of further steadying and guiding the arm 39 in its movement, the shaft 44 is provided with a laterally extending arm 46, the outer end of which is bifurcated at 47 and slidably receives the guide shaft 48 secured to the outer end of the plunger guiding arm 49. The shaft 48 and the depending member 50 are guided for solely vertical movement by the lugs 51 (Fig. 1). The arm 46 bearing upon the shaft 48 is thus prevented from rotating about the axis of the shaft 44, which prevents lateral movement of the blow pipe 33 about the axis of the shaft 44.

Means are provided for adjusting the blow pipe in a direction laterally or angularly about the axis of the arm 44. For this purpose the arm 39 is provided with a narrow extended portion 52, as seen at the right end of this arm in Fig. 3. The arm 46 is provided with a pair of upwardly extending lugs 53 through which are threaded adjusting screws 54 bearing against the extension 52 of the arm 39. After the arm 39 has been adjusted as desired with respect to the arm 46 and the shaft 44 for properly positioning the blow pipe 33, the arm 39 may be clamped in the desired adjusted position by the nut 45 and also by the bolt 55 passing through a transversely elongated aperture in the arm 39 and threaded into the arm 46. It will thus be seen that the blow pipe 33 is adjustable universally in a horizontal plane, whereby properly to center it or otherwise position it with respect to the feeder orifice, and also is adjustable vertically with respect to this orifice. These adjustments may be termed "static" adjustments.

Means are also provided for moving the blow pipe vertically and for controlling the characteristics of this vertical movement in many respects similar to the moving and control means of the plunger. The means for moving the blow pipe vertically comprises a cam 56 (Fig. 2) mounted upon the shaft 13 for angular adjustment thereabout. Here again, the cam 56 may be formed in two complementary sections, each of which is provided with arcuate slots 57 through which extend bolts 58 for securing the cam 56 to an annular hub 59, which is in turn secured to the cam shaft 13. The cam 56 is thus rotated in the direction of the arrow in Fig. 2 by power transmitted from the motor 14.

Cooperating with the cam 56 is a cam roller 60 mounted upon the end of a short lever 61 pivoted at 62 to a fixed part of the apparatus, the lever 61 having an upwardly directed substantially flat surface portion 63 similar to the portion 19 of the lever 17. Bearing upon the surface 63 of the lever 62 is a second roller 64 mounted upon a block 65, which is adjustably positioned in a lever 66 pivoted upon the rocker shaft 23. As shown in Fig. 2, the block 65 is mounted for longitudinal sliding movement in a recess in a lever 66 and is adjustable along this recess by rotation of the screw shaft 67, which is swivelly mounted in the lever 66 and is provided with an adjusting head 68 at its outer end, the screw shaft 67 being threaded through the block 65. Thus, rotation of the adjusting head 68 is effective to vary the distance between the roller 64 and the fulcrum of the lever 66, so that a rise or fall of the cam 56 will rock the lever 66 a variable amount depending upon the distance between the roller 64 and the axis of shaft 23.

A second lever 69 is pivoted upon the shaft 23 adjacent to the lever 66 and is adapted to be moved thereby and adjusted angularly with respect thereto by means of a screw 70 carrying the adjusting head 71, the screw 70 being threaded through the downwardly and laterally extending portion 72 of the lever 66 and bearing against a shoulder 73 of the lever 69. Thus, by adjusting the screw 70 by turning the head 71, the angular relation between levers 66 and 69 may be varied.

The lever 69 is connected at its outer end at 74 through a substantially vertically extending link 75 to a cross shaft 76 which extends through a vertical elongated slot 77 in the hollow sleeve 28 and is connected with the shaft 44, so that rocking motion of the lever 69 is transmitted into vertical motion of the shaft 44 and thereby into vertical motion of the blow pipe 33.

Thus it will be seen that vertical motion may be imparted to the blow pipe from the motor 14 through the mechanism described to move it toward and away from the orifice in timed relation with the movement of other parts of the device and specifically with that of the plunger which has been described. While I have shown in Fig. 2 a cam 56 which imparts a peculiar motion to the blow pipe, I also contemplate that the blow pipe might have a zero motion by using a cam having a fixed radius, as shown at 56ᵃ (Fig. 54). The blow pipe is therefore susceptible of a variety of movements and has a variety of moving adjustments which may be enumerated as follows: first, the form of movement of the blow pipe may be controlled by interchanging cams 56 for cams having other configurations, as shown for example at 56ᵃ; second, the phase of the blow pipe movements may be adjusted with respect to the phase of movements of any or all of the other operating devices by adjusting the relative angular position of the cam 56 with respect to the shaft 13. While this adjustment as shown necessitates the stoppage of the machine in order to carry it out, I contemplate also that means might be provided, such as the differential mechanism of the Peiler Patent 1,760,254, whereby this adjustment could be carried out during the continued operation of the machine; third, the amplitude of the blow pipe movement may be adjusted, that is the distance between the top and bottom limits of its movement. This may be accomplished by adjusting the position of roll 64 with respect to the axis of shaft 23; and fourth, the range or position of the stroke of the blow pipe movement may be varied by varying the angular relation between levers 66 and 69, which is accomplished by rotating the screw head 71 so that for a given position of the cam 56 the blow pipe may be adjusted to various desired vertical positions, thus simultaneously adjusting both the upper and lower limits of the blow pipe movement in the same direction and amount. Any or all of these adjustments may be used in combination with any other desired adjustments of the device, according to the will of the operator and according to the character of the articles to be formed.

*Shear construction, mounting and operation*

Means are provided for severing glass depending from the orifice comprising a pair of notched shear blades which may, if desired, be formed, mounted, operated and adjusted as set forth in the aforesaid Peiler Patent 1,760,254. Shears of this general character are illustrated in Figs. 2, 4 and 6 of the drawings hereto. Referring particularly to Fig. 6 and comparing it to Fig. 30 of the Peiler patent, it may be seen that the shears there shown are substantially the same as the Peiler shears save that in Fig. 6 two-part shear arms and a shear guiding bracket 78 are provided. Also the shears of Fig. 6 are not shown as provided with numerous adjustments shown in detail in the Peiler patent. It has been found that the use of a bracket corresponding to 78 provides a more simple and less expensive means for assuring the proper relative vertical positioning of the shear blades.

It is to be understood that other well-known types of shears, shear mounting and shear drive may be used in lieu of those described herein and in the Peiler patent.

*Modified shear construction—Double shears (Figs. 24, 25 and 26)*

Due to the fact that known types of shears are necessarily formed with one shear blade overlying the other, it has been found in practice that the shear blades have a deflecting action upon the severed glass both above and below the shears. For example, as shown in Fig. 6 where the blade 79 is adapted to close over the shear blade 80, the cut tail of glass depending from the orifice will be deflected in the direction of movement of the blade 79 and the upper portion of the severed glass will be deflected in the direction of movement of the blade 80. If then the point of severance of shears of this type is exactly in vertical alignment with the orifice, the bottom end of the glass above a bubble of glass severed by shears of this type will be deflected in one direction and the top end of the bubble in the opposite direction, so that the problem of securing uniform distribution for an article of glass becomes difficult.

Various means have been suggested by the prior art, one such means being shown in the Peiler Patent 1,760,254, for overcoming this difficulty, but these means have not been wholly successful. I have devised a type of shear mechanism by which both the cut tail of glass depending from the orifice and the top portion of the severed mass of glass will be deflected in the same direction and amount, thus making it possible, by offsetting the point of severance from a vertical through the orifice in a direction opposite to the direction of deflection of the ends, to secure a resultant substantially zero deflection for the cut tail and for the top portion of the severed mass. This means briefly comprises a means for severing the glass simultaneously at two vertically spaced points by the use of double shear mechanism.

I have shown one embodiment of such a mechanism in Figs. 24, 25 and 26, in which the operating mechanisms used for the shear blades may be the same as that used for the single shears shown in detail in Fig. 6. As shown, one of the cooperating shear members of the single shear which usually have one flat surface and one bevel surface is substituted by a blade shown at 81 and is formed as a relatively thick blade having a vertical cutting edge contiguous to the upper and lower flat surfaces of the blade rather than a beveled edge. This blade is adapted to cooperate with and pass between a pair of oppositely disposed blades 82—83, which may be of the single bevel type and have their bevels oppositely disposed and directed away from one another. Thus the severance will occur at two points spaced apart by the thickness of the blade 81 which will produce an intermediate mass of glass shown at 84 in Fig. 26.

Also in this construction, it is desired that the points of severance be offset a distance to the right of a vertical through the orifice, as seen in Figs. 24, 25 and 26, approximately equal to the deflection of the glass by the shearing action, which point of severance may be adjusted by adjusting screws 85 and 86 (Fig. 6). The cut out portion of glass 84 will be ejected from the shear means by the rapid movement thereof in conjunction with the sloping configuration of the shear blade 83. As will be noted in Fig. 26, the position of this cut off portion after the shearing action has been completed is at a relatively wide spaced portion between the shear blades 82 and 83, so that the opening movement of the shears will serve to cause this severed portion to fall out upon the floor adjacent to the apparatus where the waste glass may be collected at suitable times and remelted.

THE FORMER PORTION OF THE DEVICE

The former comprises a mold carrier mounted below the feeding mechanism in such position as to bring a series of molds carried thereby successively beneath the feeder orifice to enclose the hollow glass bubbles depending therefrom, in combination with the necessary appurtenant mechanism. The mold carrier may comprise any suitable intermittently rotated carrier, one which is relatively simple in construction and mode of operation being chosen for purposes of illustration.

Referring to Fig. 1, there is shown a single table, intermittently rotated mold carrier or table 87 mounted upon a suitable support provided with wheels 88, which are supported by rails 89, thus permitting the machine as a whole to be moved toward and from the feeder orifice, the rails 89 being supported on suitable jack screws 90, which are interconected as indicated for simultaneous vertical adjustment, whereby the machine as a whole may be raised and lowered toward and from the orifice.

As seen in Figs. 1 and 9, the machine comprises a rigid base structure including axle members 91 and 92 connected by a cross member 93. Suitably stepped in the member 93 is a stationary vertical center column 94 about which the mold carrier or table 87 is adapted to rotate. The mold carrier 87 is suitably supported on anti-friction bearings 95 (Fig. 17) which separate it from a supporting structure 96 (Fig. 1), the structure 96 being secured rigidly to the cross member 93.

*Table rotating means, Figs. 1, 9 to 13 inc., and 22*

Means are provided for imparting intermittent rotary movement to the table or mold carrier 87 including an oscillatory structure carrying a table-rotating pin which is engaged with the table for imparting rotary movement thereto during the oscillation of the structure in one direction, means for locking the table during the dwells thereof and while the oscillatory structure is moving in the opposite direction, and means for imparting oscillation to the oscillatory structure. All of these means are synchronized with the operation of the feeder by suitable timing means diagrammatically illustrated in Fig. 22 and shown in further detail in Fig. 19.

The oscillatory structure is indicated at 97 and is mounted for oscillation about the axis of the column 94. For this purpose, the member 97 may be formed in two parts as shown, the parts being bolted together to engage a sleeve 98 which is in turn mounted upon the column 94. One arm of the structure 97 is provided with a table rotating pin 99 which is constantly urged upwardly by a spring 100, the pin 99 being slidably received in one end of the member 97 as shown in detail in Fig. 11. The upper end of the pin 99 is preferably beveled and cooperates with ratchet shaped recesses 101 in the table or mold carrier 87. Six of these recesses are indicated in Fig. 9, corresponding in number with the molds shown in Fig. 7, so that upon each complete oscillatory movement of the structure 97, the mold carrier 87 will be indexed an angular distance corresponding to the distance between two adjacent molds and the molds will be successively positioned beneath the feeder orifice to receive glass therefrom.

For oscillating the structure 97 and thereby oscillating the table, there is provided a fluid pressure cylinder 102 having a piston 103 therein carried by a piston rod 104. On the end of the piston rod 104 remote from the cylinder 102 is a cross head 105 slidable in suitable guides 106. Slidable in guides in one arm of the structure 97 in a direction substantially radial of the said structure is a block 107, which is pivotally connected to the cross-head 105 at 108. Thus, reciprocating movement of the piston 103 is translated into oscillatory movement of the structure 97 and therefrom into intermittent rotary movement of the mold carrier 87.

Fluid pressure is supplied to opposite ends of the cylinder 103 through pipes or passages 109 and 110 respectively (Fig. 22), the latter pipe or passage communicating with the right hand end of the cylinder and also with a throttling valve 111 shown in detail in Figs. 12 and 13, the valve 111 communicating through a pipe or passage 112 with the timer T, as does also the pipe 109. The timer will be described hereinafter.

Means are provided for locking the table during a dwell thereof, comprising a locking pin 113 adapted to enter any one of a suitable number of recesses formed in the underside of the mold carrier 87. The locking pin 113 is preferably formed on the upper end of the piston rod 114 carrying a piston 115 reciprocable in a cylinder 116. A spiral spring such as shown at 117 may be provided extending between the underside of the piston 115 and the lower head of the cylinder 116 for constantly urging the piston 115 upward and thus urging the locking pin 113 into locking engagement with the mold carrier 87. When it is desired to move the locking pin out of locking engagement with the table, fluid pressure may be admitted to the cylinder 116 above the piston 115 through a pipe 118 leading from the timer T. It will be understood in this connection that the timer T supplies and exhausts pressure at the desired times to each of the fluid pressure mechanisms dependent upon it and that these times may be adjusted as desired in a manner hereinafter to be described.

The purpose of the cushioning valve 111 is adjustably to cushion the exhaust from the right hand end of cylinder 102 (as seen in Fig. 9) and thus to bring the mold carrier 87 to an easy stop at and adjacent to the end of each step of its movement. This valve is shown in detail in Figs. 12 and 13 and comprises a casing 119, which may be suitably secured to the cylinder 102 as by bolts 120. The casing 119 is provided with an interior chamber 121 which communicates with the right hand end of the cylinder 102 through a passage indicated at dotted lines at 122. A second passage 123 communicates with the interior of the casing 119 in two ways, this passage communicating with the timer T through the pipe 112 (Fig. 22). In the first place, the passage 123 communicates with the interior chamber 121 of the casing 119 through a ball check valve 124 which admits pressure from the passage 123 to the chamber 121, but closes upon the reverse flow of pressure. Thus, no impediment is offered to the supplying of the pressure to the cylinder 102 to force the piston from the right to the left, as seen in Fig. 9, as this pressure may pass freely through the check valve 124. A passage 125 also communicates between the port 123 and a port 126 extending downwardly into the top of the chamber 121, the port having the configuration shown in Fig. 12. A disc 127 is rigidly secured to a shaft 128 extending axially downward into the casing 119, the disc bearing against the top wall of the chamber 121. The disc 127 is provided with a sector shape opening 129 (Fig. 12). Thus, when the disc 127 is rotated so that the opening 129 is in alignment with the port 126, exhaust from the right hand end of cylinder 102 may pass freely through the passage 122, chamber 121, aperture 129, port 126 and passage 125 to the outlet port 123.

At or adjacent to the end of the stroke of the piston 103 in the cylinder 102 from left to right, which is the active stroke of the piston in rotating the mold carrier 87, the disc 127 is rotated so as to move the aperture 129 and the port 126 out of register. Under these circumstances, pressure is forced to pass from the chamber 121 through the narrow opening 130 to the passage 125, and as the passage 130 is controlled by the needle valve 131 adjustable by the thumb screw 132, it will be seen that the exhaust of pressure at the end of the table driving stroke may be controlled as desired to cushion the piston movement and thus gradually to stop the table by the resilient braking means effected by the compression of the fluid at the right hand end of the cylinder 102.

Means are provided for automatically rotating the disc 127 in timed relation to the piston movements. This means comprises an arm 133 rigidly secured to the shaft 128 carrying the plate 127 and connected by the link 134 to the oscillating structure 97, whereby the movement of the piston 103 to the right, as seen in Fig. 9, will rotate the disc 127 in a counterclockwise direction to move the opening 129 out of registry with the port 126 and thus throttle the exhaust. The time at which the opening 129 moves out of registry with the port 126 may be adjustably determined by securing the link 134 to the arm 133 at any one of a plurality of openings, as shown at 135 in the arm 133, thus adjustably changing the time of operation of the cushioning action of the cushioning valve 111.

*Molds, supports therefor, construction and operation (Figs. 1, 7 and 8)*

Figure 7:
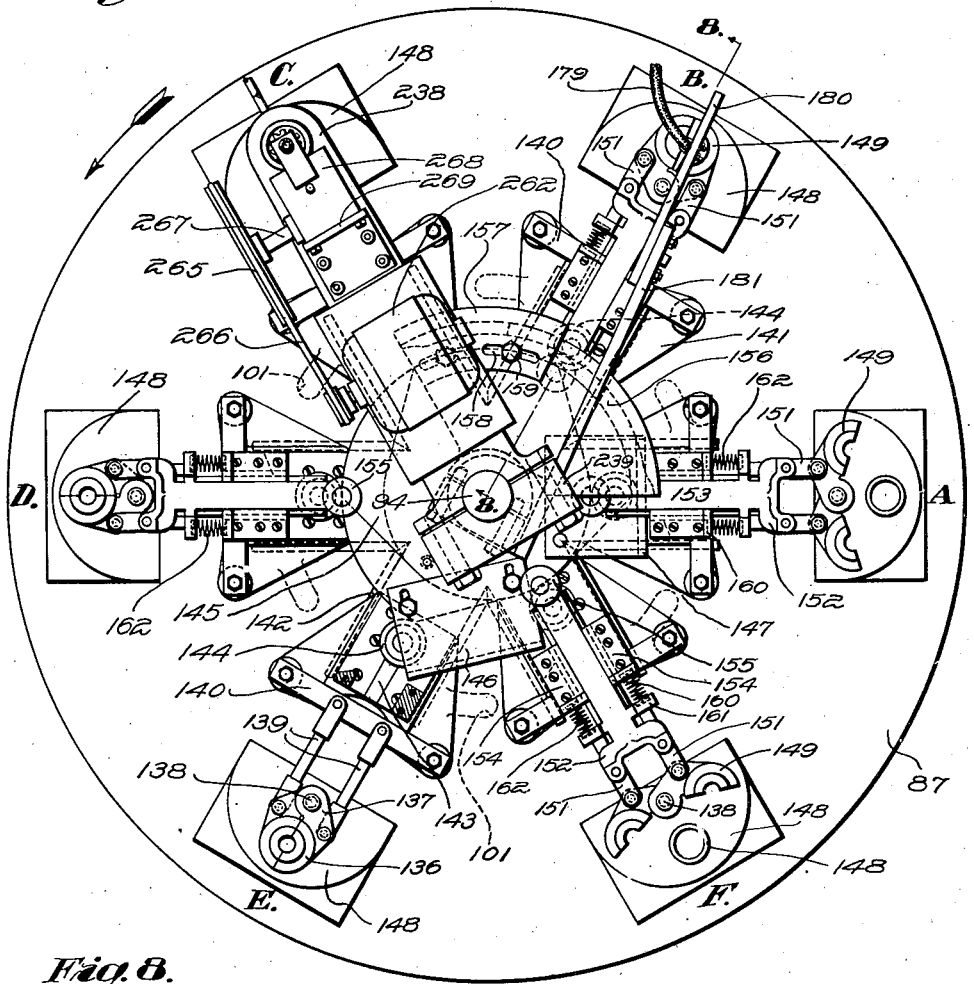
Fig. 7 is a plan view of one embodiment of the machine portion of the apparatus.

A plurality of body blow molds having internal cavities formed in accordance with the configuration of the articles to be formed are provided on the mold carrier. In this instance I have shown six blow molds 136 arranged on the carrier 87 and adjacent to the periphery thereof. As shown in Fig. 7, there are six dwell positions for the blow molds denoted as A to F respectively, the position A being that in which the axis of the blow mold is disposed in vertical alignment with the feeder orifice.

The blow molds may be formed in the conventional manner in two complementary halves and may be formed either integral with the hinge portions thereof as shown in the accompanying drawings or there may be separate mold carriers having hinged portions thereon in which interchangeable mold sections are adapted to be mounted, this latter also being a known form of construction and hence not being shown in detail in the accompanying drawings. As shown at position E in Fig. 7 and also in Fig. 8, the halves of the mold 136 are provided with hinge portions 137 which are received about a suitable vertically disposed pintle 138 secured to the table 87 in any desired manner.

Means are provided for opening and closing the blow mold sections when desired. These means comprise links 139 connecting points on the mold carriers or molds, if they be made integral, with a cross member 140 secured in a member 141 slidable radially of the table 87 in guides 142. Resiliently secured in the slide member 141 is a block 143 which is maintained normally rigid with the member 141 by spring detents (not shown), so that if the member 143 is positively moved by means hereinafter to be described and the molds are prevented from opening or closing, there may be a relative movement between the members 141 and members 143 which will prevent breakage of the parts.

Mounted upon the members 143 are cam rollers 144 which engage against the outer periphery of an oscillating cam 145 secured to the oscillating sleeve 98 rigid with the oscillating structure 97.

The outline of the cam 145 is indicated in Fig. 7 as is also the limits of its movement in response to movement of the oscillating structure 97 with which it is rigid. The configuration and movements of the cam 145 are such that the mold 136 will be closed while at position A, as seen in Fig. 7, by the clockwise movement of the cam about the axis of column 94, which is incident to the return stroke of the oscillating structure 97. This is accomplished by the 60° oscillation of the cam 145 which causes the high point thereof to be opposite the roller 144 of the mold 136 while it is at position A in place of the low point of this cam. The mold 136 remains closed until it has been moved to position E, at which time the oscillating movement of the cam will substitute a small radius portion for the large radius portion opposite the roll 144 in response to the oscillation of the cam, due to the same return or clockwise movement of the oscillating structure.

In order to cause the roller 144 to be moved inwardly by this return oscillation of the cam, there is provided an overhanging portion 146 on the cam 145, which will engage the outer radial side of the roller 144 while at position E and cause it to be positively moved inwardly, thus effecting an opening of the mold 136 at position E for the removal of the completed article.

During the movement of the mold from position E to position F there is no relative movement between the roller 144 and cam 145 and therefore there is no tendency for the mold to close. It is essential, however, in order to prevent the closed mold contacting with the formed glass bubble and possibly also with the blow pipe, if this pipe were extended sufficiently far down, that the mold be open as it arrives at position A. The cam 145 is therefore provided with a second overhanging portion 147, which, upon the clockwise oscillation of the cam 145, will be positioned opposite the roll 144 at position F by the return movement of cam 145 while the mold carrier is stationary. Upon movement of the mold from position F to position A, this cam portion 147 will move therewith as the oscillating structure 97 is during this movement locked to the mold table. This insures therefore that the mold will be wide open as it arrives at position A. Inasmuch as the mold must be closed at position A, the return oscillation of the cam 145 in a clockwise direction will move the overhanging portion 147 away from the roller 144 at position A and will permit and cause the closing of the mold.

While it might in some instances be desirable to use separate and replaceable bottom plates for the molds, there is shown in the instant drawings a combined bottom plate and slide plate 148 upon which latter the body blow mold sections are adapted to slide. In practice any desired form of bottom plate rigid, movable, or otherwise may be used.

There is also provided in connection with the blow molds, 136 neck rings 149 which may be of any conventional type and preferably are pivoted on the same axes as the blow molds 136, that is on the pintles 138. The neck rings 149 may be integral with their pivoting parts or they may be of the interchangeable type which are securable to neck ring carriers which may in turn be pivoted as described. Inasmuch as both of these constructions are well known in the art, the construction shown in the drawings is the simpler one, in which the neck rings are integral with their hinge portions. As shown, the lower part of the neck rings are recessed and fit over protruding portions on the upper part of the blow molds, so that opening of the blow molds is effective to open the neck rings, this interfitting being shown at 150 in Fig. 8. Thus, the blow mold opening means serves also to open the neck rings.

Means are also provided for cracking and/or opening the neck rings independently of the blow molds when such action is desired. Such means comprise links 151 connecting the neck rings with yokes 152. The yokes 152 are formed on the outer ends of members 153 slidable in guideways 154 formed upon upwardly extending portions of the slide members 141, the members 153 being provided adjacent to their inner ends with cam rollers 155 for engagement with a suitable fixed cam.

Figure 8:
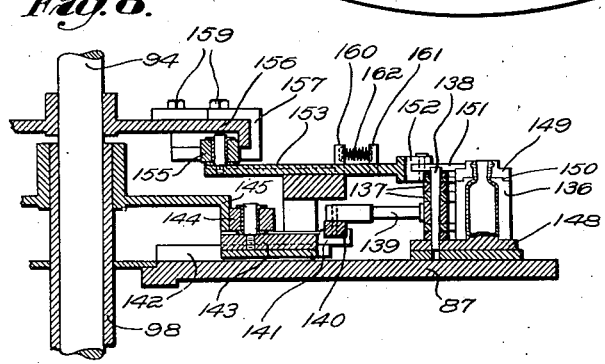
Fig. 8 is a partial vertical sectional view taken substantially on the line 8—8 of Fig. 7.

As illustrated in the accompanying drawings, Figs. 7 and 8, it is desired only to crack the neck ring open slightly adjacent to station B and perhaps to some degree at one side and/or the other of this station. For this purpose a fixed cam 156 overhanging the path of the slides 153 is provided and engages the radial outward side of the rollers 155 in a sector of their movement adjacent to station B.

As shown in Fig. 7, the cam 156 is provided with an auxiliary part 157. The cam 156 and its auxiliary portion 157 are preferably angularly adjustable around the column 94 of the machine, so as to predetermine the point at which the cracking of the neck ring is started. The section 157 is in effect a continuation of the cam 156 and is angularly adjustable with respect thereto, as shown in Fig. 7, by providing the section 157 with arcuate slots 158 through which extend bolts 159 threaded into the section 156. Thus, the point at which the neck ring is cracked is adjustable as desired about the axis of the table as is also the length of time the cracking is continued by adjusting the position of cam 156 with respect to the column 94 and the relative position of cam portion 157 with respect to cam 156.

The time during which the neck ring is cracked for the reheating of the neck is thus adjustable as to its position in the cycle of operation of the device and is also adjustable independently as to the duration of such cracking. By this reheating is meant the time provided for permitting the internal heat in the neck portion of the glass to equalize throughout the neck portion and to reheat the skin thereof which has been chilled by contact with the cooler neck ring.

For retaining the neck ring closed the remainder of the time when the blow mold 136 is closed and for urging the neck ring toward at least the furthest closed position permitted by the position of the blow mold halves, the guideways 154 are provided with upwardly extending portions 160 and the members 153 are provided with upwardly and laterally extending portions 161, the extensions 160 and 161 being separated by compression springs 162. Due to the peculiar and novel arrangement employed, springs 162 tend at all times to urge the neck rings toward their closed position with respect to the blow mold halves, but offer no resistance nor are they compressed when the blow molds and the neck rings are opened simultaneously. Compression of the springs 162 is caused only by the configuration of the cams 156 and 157, which crack the neck ring for a time while the blow mold remains shut and thus compress the springs 162, these springs serving to close the neck ring again when this action is permitted by the configuration of cams 156 and 157.

*Mold constructions and operation for double neck ring process (Figs. 16 and 17)*

In some instance it may be desired to use a double neck ring process, that is one in which the neck portion of the glass is given a preliminary configuration in an initial or primary neck ring and later given its final desired configuration in a secondary neck ring, both neck rings being adapted to cooperate with a single body blow mold. This principle may be even more broadly expressed and likened to the well known commercial manufacturing process by which a portion of a glass article is given a preliminary configuration in a preliminary or what is sometimes known as a parison mold and later given its final desired configuration in the blow mold. This double mold process may be used with the "auto blow" process. For this reason there is disclosed in this case a modification of the principal process in which two neck rings may be used in succession, the first or primary neck ring or neck mold being used to impart a preliminary configuration to the neck, and the second, to impart a desired final configuration thereto.

A construction for using the double neck ring process is shown in Figs. 16 and 17 and differs from that shown in the preceding figures particularly as to means for operating the neck ring which moves with the blow mold or the primary neck ring. The parts are given the same reference characters, however, insofar as they are the same.

The chief difference in the operating means for the primary neck ring 149ª employed in this device and the operating means for the neck ring 149 previously described is that the mechanical springs 162 and their abutments are replaced by air springs. Each air spring comprises a cylinder 163 to which air is continuously supplied through pipe 164 in any suitable manner, not shown. In the cylinder is a suitable piston, the piston rod of which is connected to the upturned end 165 of the member 166 slidable radially in the guideways 154 carried by the member 141 and corresponding to the member 153. The member 166 is provided with the cam roller 155 at its inner end and is connected to the complementary portions of the neck ring 149ª by the links 151, as previously described.

The substitution of the air spring for the mechanical spring 162 is merely to permit the wide opening of the neck ring halves 149ª when the blow mold is closed, which could not easily be effected by the use of compression springs 162, at least in a commmercial operative machine.

The cam roller 155 is controlled by a cam 167 of different configuration from the cam 156 and extending around a major portion of the periphery of the machine, as it is necessary to keep the neck ring 149ª open for a major portion of the rotation of the table. As shown in Fig. 16, the cam 167 is so shaped as to open the neck ring halves 149ª between the positions A and B and to retain them open until after they pass station E, at which point the ware is removed.

Adjacent to stations C or D, and in the present drawings, (Fig. 16) adjacent to both stations, there is mounted a means for supporting and operating a secondary neck ring for imparting the final desired configuration to the neck of the article to be formed. This neck ring is shown at 149ᵇ and may be formed in the same manner as the neck rings 149 or 149ª and pivoted upon a suitable vertical pintle 168, which is in turn secured to a bracket 169 mounted upon a vertically extending post 170 secured to a lateral extension 171 from the frame of the machine.

For operating the neck ring halves 149ᵇ there is provided a pneumatic cylinder 172, pressure to which is controlled by the timer T. The piston rod 173 of this cylinder has secured to its outer end a yoke 174 connected to the neck ring halves by links 175 in the well known manner. Thus when pressure is admitted to the head end of cylinder 172, that is, the end remote from the axis of the mold carrier 87, the piston in the cylinder will be forced outwardly (to the left as seen in Fig. 17) and the neck ring 149ᵇ will be closed; opposite movement of the piston serving to open the neck ring.

Means are also provided for adjusting the secondary neck ring vertically in order to compensate for molds of different heights, whereby various shapes and sizes of articles may be formed. This means in the present instance comprises vertical adjusting means interposed between the neck ring and its operating means on one hand and the means which support this mechanism on the other. As shown, the supporting bracket 169 is vertically adjustable with respect to the column 170 by being adjustably clamped to this column by the set screw 176, or the column 170 may be vertically adjusted with respect to the supporting structure 171 and clamped in the desired adjusted position by the set screw 177.

While in the device shown, there is a secondary neck ring disposed at each of stations C and D, it is also contemplated that these neck ring sections may be of different form, so that the one at station C may impart an intermediate form to the neck of the article different from that imparted thereto by the primary neck ring 149ª; and the neck ring at station D will impart the final desired configuration to this neck. The internal form of the primary neck ring 149ª and the relatively different form of the secondary neck ring 149ᵇ will be more fully explained hereinafter in explaining the steps of the process carried out by the use of this structure.

Piercing flame and construction providing therefor (Figs. 1 and 7)

In forming articles by the "auto blow" process in which a bubble is first blown while integral with the glass in the feeder bowl, then enclosed in the mold and expanded to the shape of that mold and next sheared or otherwise severed from the parent body of glass, the severing means operate almost universally to seal the glass in the mold into a completely enclosed hollow body. It is necessary therefore to provide an opening into the interior of this body, corresponding, for example, to the neck of a bottle or to the neck opening into a paste mold article, such as a bulb for an incandescent electric lamp. Probably the simplest form of means for providing this neck opening is a burner having a short, hot flame directed substantially axially downward in the direction of the opening to be formed, whereby the glass at the point at which it is to be opened will be heated so hot as to become substantially a fluid, the force of the burner will then cause a hole to open up and the continued heat will cause the fluid glass around the hole thus formed to draw back, due to surface tension effects, thus providing the necessary opening.

I have shown in Figs. 1 and 7 a construction for accomplishing this object which comprises a burner 178 having its axis disposed substantially vertical in vertical alignment with the center of the mold when disposed at station B. This burner may be of any desired type in accordance with the fuel to be used. The fuel may be gas, gas and air or oxygen, acetylene, or acetylene or air and oxygen, as may be desired or necessary. Fuel is conducted to the burner through a flexible tube 179 from any suitable source of supply.

Means are provided for supporting the burner 178 in predetermined adjusted position with respect to the mold at station B. Such means as shown in the present drawings comprise a supporting member 180 to which the burner is clamped in any desired manner. The member 180 is suitably secured to the end of a substantially horizontal extending arm 181 provided with suitable bracket means 182 for engaging the center column 94. As shown in Fig. 1, the bracket means 182 may be adjusted vertically and angularly as desired and clamped to the column 94 in the desired adjusted position by the set screw 183, the vertical adjustment of the burner thus compensating for its use in connection with molds of different heights.

Figures 27, 28:
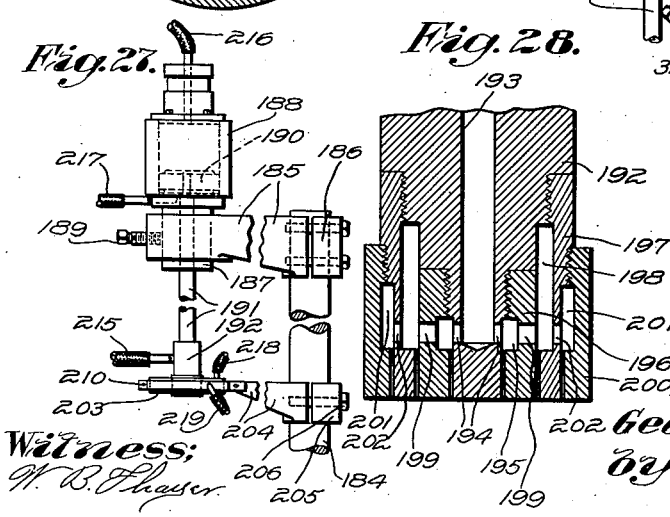
Fig. 27 (Sheet 12) is a fragmentary view with parts broken out showing a fixed "pick off" adapted for use in connection with an intermittently rotated mold carrier.
Fig. 28 is a fragmentary view in vertical section of a head which may be used with either the fixed or traveling "pick off"

Pick off apparatus for forming neck opening in article—Fixed pick off (Figs. 27, 28 and 29)

Another and more positive method of forming the neck opening in a completely closed hollow body of glass in a mold is by removing the top sealing portion thereof, whereby not only to provide a neck opening therein, but also to remove the bunched portion of glass formed by the operation of the shears which portion bears any marks which may be made by the shears, thus providing a more perfect article and rendering the operation of finishing the neck portion of the article more simple.

Briefly outlined, this process includes the use of a suction head which is movable down into engagement with the glass above the mold and thereafter movable away from the mold after suction has been applied to cause the glass to remain in engagement with the head. This drawing away of a portion of the glass from the remainder thereof in the mold causes the attenuation of the portion of glass connecting the portions being separated, thus forming a thinned wall which is easily severed either by breaking, due to its thin and relatively cold and rigid section, or which may be easily burned through by the use of a suitable burner. While I contemplate the possibility of using both of these methods, I have chosen to illustrate merely the use of an annular burner for severing the thinned wall produced by the action of the pick-off head.

Pick-off means for forming the neck of the article are preferably employed shortly after the severence of the glass from the parent body. For this reason I have shown two embodiments of this part of my invention, one in which the pick-off means is stationary and is located adjacent to station B, or the first station after the severance, and the other, in which the pick-off means is movable to cooperate with the molds while moving between stations A and B. I will first describe an operation of the pick-off means when used at a fixed position at station B.

Adjacent to station B there is preferably mounted a vertically supporting column 184 (Fig. 27), which may be mounted in any desired manner to the frame of the machine, for example in a manner similar to the manner shown in Fig. 17 for mounting the secondary neck ring and its operating means. Near the top portion of the column 184 is a laterally extending arm 185 suitably adjustably secured to the column by the use of a clamping cap 186 which is preferably bolted to the arm 185, whereby molds of different heights may be compensated for. The outer end of the arm 185 is provided with a suitable socket to receive a downwardly extended portion 187 of a vertically disposed pneumatic cylinder 188, the portion 187 being secured in vertically adjusted position in this socket by the set screw 189. The cylinder 188 is provided with a suitable piston 190 carried on the end of the downwardly extending piston rod 191, at the lower end of which is a pick-off head 192. Thus movement of the piston 190 in the cylinder 188 will cause the pick-off head 192 to move toward and away from the mold as desired.

The pick-off head 192 may be constructed as shown in section in Fig. 28 in which the head is provided with an axial passage 193 extending down almost to the bottom or active surface of the head and communicating through lateral passages 194 with an annular chamber 195 formed between the lower portion of the central member of the head and an annular member 196 threaded thereon. The lower end portions of the central member of the head and the annular member 196 are spaced slightly to provide an annular slot opening to the lower surface of the head. Outside the member 196 is a second annular member 197 threaded to the central member of the head and recessed to provide an annular chamber 198 between itself and the member 196, this chamber also opening to the lower or active surface of the head through an annular slot and communicating with the chamber 195 through lateral ports 199. A third annular member 200 is threaded to the member 197 and between these members is formed an annular chamber 201 communicating with the lower or active surface of the head through an annular slot and with the chamber 198 through lateral ports 202.

Obviously, any desired means of forming the suction head may be used to provide a plurality of openings or slots in the lower or active surface thereof, which are effective for the application of suction to retain the glass in engagement with the head. The form shown in Fig. 28 and specifically described is to be considered therefore merely as illustrative as one possible construction of the device.

Positioned adjacent to the lowermost operating position of the head 192 and in a position to direct an annular flame or annular series of jets for severing the glass portion removed by the head from the glass in the mold is an annular burner indicated at 203. This burner may be supported by an arm 204 from the column 184, the arm being adjustably secured to the column by a clamping cap 205 and bolts 206, as seen in Fig. 27. Thus, the burner 203 may be adjusted vertically to compensate for the height of the mold used and may be adjusted angularly about the column 184 to center it with respect to the pick-off head 192.

I have shown in Fig. 29 a possible construction for the burner 203, this construction as shown including an annular member 207 having a downwardly and outwardly inclined inner bevel surface 208 in which are formed a plurality of flame jet openings 209 directed downwardly and inwardly toward the annular wall of glass which is to be severed. The member 207 is secured in an annular clamping member 210 which is in turn secured to the arm 204 for clamping the burner to this arm. Threaded into the annular member 207 is a second annular member 211 providing a chamber 212 between the inner wall of the member 211 and the inner bevel wall 208, and the side and top walls of the member 207, a second annular chamber 213 being also provided between the member 211 and the outer wall of member 207. These annular chambers are provided one for gas or a combustible fluid and the other for air or a combustion supporting fluid. The wall of the member 211 is provided with a series of jet openings 214 preferably corresponding in position and alignment with the jet openings 209, so as to produce an annular series of sharp pointed jets of flame effected to sever the thin annular wall of glass produced by the upward movement of the "pick-off" head.

Suction may be applied to the "pick-off" head through a flexible pipe 215 (Fig. 27) which communicates with the central passage 193, shown in Fig. 28, at one end and in a suitable manner with the timing device T (Fig. 23) in a manner hereinafter to be described. The fluid pressure cylinder 188 is similarly provided at its opposite ends with pressure passages 216 and 217 communicating with the timer T, as shown in Figs. 27 and 23. The burner 203 may if desired be provided with its combustible fluid and combustion supporting fluid from the timer T through passages 218 and 219, whereby the flame may be maintained continuously at its hot burning range or it may be reduced between the desired periods of operation. It is also to be understood that after the breaking of the suction and when it is desired to remove the severed portion of glass from the "pick-off" head 192, pressure may, if desired, be applied through the passage 215 from the timer and through the pick-off head to force the glass thereon away from the head, this action taking place after the mold has been moved away from its position beneath the "pick-off" head.

*Pick-off means for forming neck opening in article—Moving pick-off (Figs. 16 and 18)*

In certain instances it is desirable that the action of the "pick-off" means take place prior to the arrival of the mold at station B. Under these circumstances it is necessary that the "pick-off" means operate upon the mold during the movement thereof from station A to station B. Such a means may comprise a "pick-off" head and burner which are oscillatable to cooperate with each mold in succession during the movements of such molds between stations A and B.

The construction here shown of the "pick-off" head and burner differs but slightly from that previously described for the fixed "pick-off", the only substantial difference being that the "pick-off" head 192$^a$, shown in Fig. 18, is provided with a communicating passage for vacuum or passage axially therethrough rather than laterally therefrom, and as shown, the flexible tube 215$^a$ passes from the stem of the "pick-off" head 192$^a$ in an upward axial direction. The construction of the burner 203 may be identical with that shown in detail in Fig. 29 and previously described.

Means are provided for oscillating the burner 203 and pick-off head 192$^a$ about the axis of the column 94 to permit them to cooperate with each mold in succession. Such means comprises an oscillatory carriage 220 comprising an L-shaped arm secured to a sleeve portion 221 embracing the vertical column 94 of the machine and supported at its lower portion by a collar 222 vertically adjustably secured to the column 94 by a suitable set screw. Thus, the oscillatory structure 220 and the burner and pick-off head carried thereby are vertically adjustable so that they may cooperate with molds of different heights.

Means are provided for oscillating the structure 220 to cause the burner and pick-off head carried thereby to follow each of the molds in succession. Such means comprises a laterally extending bracket portion 223 having an arcuate slot 224 therein in which works a vertical pin 225 rigid with the oscillating cam 145 and extending upward through a suitable arcuate slot in the rigid cam 167 inside the path of movement of the roller 155. The arcuate slot 224 is formed on an arc struck from the vertical center axis of the machine, that is the axis of column 94, but its angular extent about this axis is less than the angular movement of the cam 145. Thus, upon the movement of the cam 145 with the table 87 in driving the table, the pin 225 will be positioned at the end of the slot 224, as shown in Fig. 16, so that the bracket 223 and the oscillatory structure carrying the burner and "pick-off" head will be moved with the table and in a predetermined angular position relative thereto, such that the "pick-off" head will be held in vertical axial alignment with a mold. This action continues until the "pick-off" head and the mold arrive at station B, at which point the "pick-off" head is stopped by means hereinafter to be described.

Upon movement of the oscillating cam 145 in the opposite direction during the dwell of the mold at station B, the pin 225 will move to the opposite end of the slot 224 and then carry the oscillating structure 220 with it to cause this structure to return toward station A in order to cooperate with the next succeeding mold. This oscillating structure will be stopped short of station A, so as not to interfere with the operations and mechanism at that station, by means hereinafter to be described, the action being permitted by the lost motion connection due to the arcuate slot 224, so that the pin 225 will again be moved relative to the member 223 to the other end of the slot as shown in Fig. 16.

The burner 203 is provided with a clamping strap 210ᵃ, similar to the strap 210, shown in Figs. 27 and 29, this strap forming a part of a rigid arm secured to the arm 220 in any desired manner. The "pick-off" head 192ᵃ is preferably provided with a stem 226 mounted in an arm 227 pivoted to the member 220 at 228 and guided to provide against lateral movement with respect to the arm 220 by a pair of guides 229 mounted rigidly with the arm 210ᵃ, as illustrated in Fig. 18.

Means are provided for moving the pick-off head 192ᵃ in a substantially vertical direction comprising a fixed cam 230 arranged adjacent to the path of movement of the pick-off head and cooperating with the roller 231 mounted upon the arm 227. The cam 230 may be supported from the base structure of the machine in any suitable or desired manner, as for example by the L-shaped brackets 232 secured to the member 93, as indicated in Fig. 18. Means are provided for adjusting the cam 230 vertically with respect to the brackets 232 by providing the upwardly extending legs of these brackets with elongate openings 233 through which extend bolts 234 threaded into the cam 230, thus to provide for the use of the pick-off head with molds of different heights.

For stopping the oscillatory member 220 at each end of its path of movement, there are provided stops 235 and 236 on the cam 230, which are of sufficient height to contact with and stop the roller 231.

The configuration of the cam 230 is such as to cause the pick-off head to be lowered to engage the upper portion of the glass extending above the mold and neck ring just after the mold is moved away from station A, then suction is applied to the head 192ᵃ to cause the glass to be retained in contact therewith, then the cam 230 causes the head 192ᵃ to move upwardly away from the mold carrying a portion of the glass therewith and forming a thinned section of the wall connecting this portion of the glass with the remainder of the glass in the mold, then the burner 203 is effective to sever the portion being removed from the remainder of the glass at the thinned wall section, so that the head 192ᵃ retains a picked-off portion of glass, as shown at 237 (Figs. 18 and 32), which portion is later discharged therefrom preferably by the application of pressure to the head 192ᵃ after relative movement is had between the pick-off head and mold.

*Finishing means, construction and operation, (Figs. 1, 7, 14, 15, 17 and 22)*

Means are provided in connection with my invention for finishing the neck portion of the article into which a hole has been formed as above described, this means serving in the case of bottles to form the interior of the neck or "corkage" of the bottle and also serving to form the top of the neck or "finish". For this purpose, there is preferably employed the tool having a reaming action entering the interior of the neck to force the glass therein outwardly and smooth up the inside surface of the neck. This is preferably combined with a tool portion having a pressing action to press the top of the glass to form the top or "finish" of the neck. The reaming portion of the tool is preferably given a relative rotation with respect to the glass article by suitable automatic means. In addition, it is often desirable in carrying out my process to apply pressure to the interior of the article formed by the above described means and for this purpose the finishing tool is combined with means for applying pressure to the interior of the article being formed during the neck finishing operation.

Figure 14:
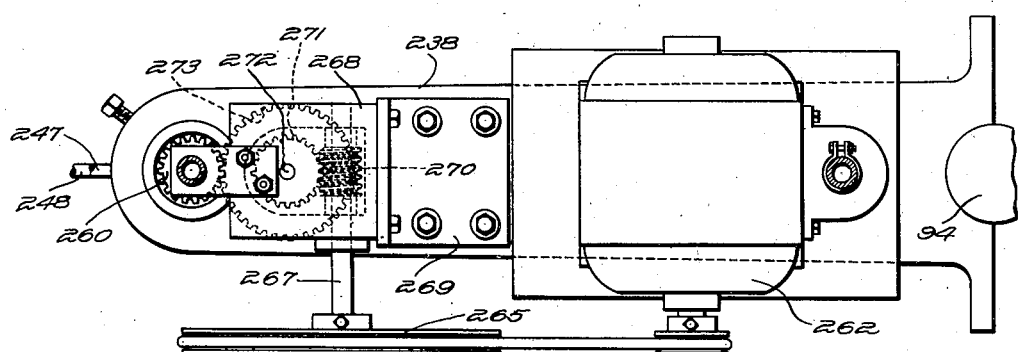
Fig. 14 is a plan view of the finishing tool operating means.
Figure 15:
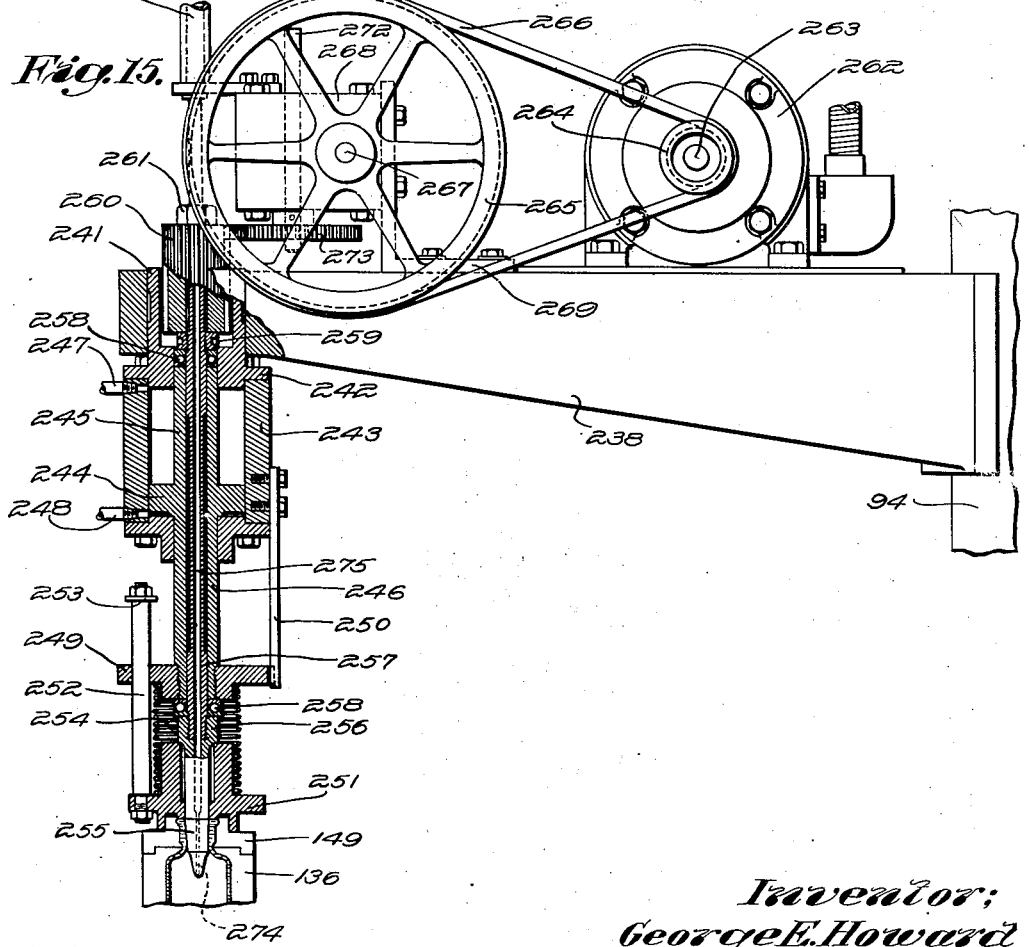
Fig. 15 is an elevation with parts in vertical section of the finishing tool cooperating with the mold to finish a bottle and the operating means for the finishing tool.

As shown in the accompanying drawings and particularly in Figs. 14 and 15 thereof, there is provided a finishing mechanism which is mounted upon a laterally extending arm 238 adapted to be vertically adjustably secured to the center column 94 of a machine in any suitable manner, as by the use of a cap member 239, engaging the opposite side of the column 94 from the arm 238 and held rigid therewith by clamping bolts 240.

Secured in the outer end of arm 238 by a suitable set screw is an upwardly extending portion 241 of the head 242 of a pneumatic pressure cylinder 243. Operating within the cylinder 243 is a piston 244 having piston rod extensions 245 and 246 extending through the upper and lower heads of cylinder 243 respectively. Pressure may be admitted to the cylinder 243 to move the piston 244 and the parts carried thereby vertically through pipes 247 and 248. At the lower end of the piston rod portion 246 is secured a plate member 249. Rotation of the piston 244 and the parts designed to be rigid therewith is prevented by the guide 250 suitably secured to the cylinder 243 and slidably received in a suitable groove in the plate member 249. While there is but one of these guides shown, it will be understood that as many as desired or necessary may be used.

A presser plate 251 is preferably employed for contacting with the upper surface of a neck ring 149 which is in operative position with respect to one of the molds 136 at the time the finishing is to be carried out. The presser plate 251, shown in Fig. 15, is adapted to cooperate with the neck ring 149 employed in the form of the device shown in Figs. 7 and 8. This presser plate is provided with a plurality of upwardly extending posts 252 suitably bolted thereto, and passing upwardly through suitable apertures in the plate 249. In the usual construction, three of these posts are employed, but it will be understood that any suitable number, preferably two or more, may be used. At their upper ends, the posts 252 are provided with suitable stops 253 for limiting the downward movement of the presser plate 251 with respect to the plate 249.

A compression spring 254 is provided extending between the lower side of the plate 249 and the upper side of the plate 251, so as always to urge the latter downwardly. As clearly illustrated in Fig. 15, the plate 251 is adapted to contact with the upper side of the neck ring 149 prior to the completion of the downward movement of the plate 249 which is carried rigid with the piston 244 in the cylinder 243. Further movement of the piston in the cylinder serves to compress the spring 254 and thus yieldably to urge the plate 251 down on the neck ring and into pressing relation with the upper neck finish of the glass therein.

Extending through an aperture located centrally of the presser plate 251 is a finishing tool 255. This tool is mounted as shown for rotation about a vertical axis, but is not movable vertically with respect to the piston 244. Also, in order that the device be operable with a variety of types and sizes of ware, the tool 255 is preferably made removable. For this purpose, the tool is provided with an internally threaded socket 256 at its upper end which is threaded onto the lower end of a rotatable hollow shaft 257 which extends completely through the piston rod portions 246 and 245 and the piston 244. In order to permit rotation of the tool 255 and the shaft 257 with respect to the piston rod portions and the piston, there is provided at the upper and lower ends of piston rod portions 245 and 246 respectively, ball bearings 258 with suitable associated raceways. The raceway of the upper bearing 258 is secured to the shaft 257 by the internally threaded nut 259. Above the nut 259, there is provided a long gear 260 surrounding the shaft 257 and secured thereto by a nut 261 threaded on the gear. Thus motion may be imparted to the gear to rotate the tool 255 while the piston 244 is at any of its vertically movable positions and without interrupting the movements of the piston.

Means are provided for rotating the gear 260 and the finishing tool rigid therewith from any suitable source of power, for example, the electric motor 262 mounted upon the arm 238, such means preferably including speed reducing gearing. As shown in the accompanying drawings, the shaft 263 of the motor 262 carries a small pulley 264 which is adapted to drive a larger pulley 265 through a suitable belt 266. The pulley 265 is mounted upon a shaft 267 journaled in suitable bearings in a gear case 268 mounted upon a suitable bracket 269 which in turn is mounted upon the arm 238. As shown in Fig. 14, the shaft 267 is provided intermediate its bearings in the gear box 268 with a worm 270 meshing with a worm wheel 271 mounted upon a vertical shaft 272 journaled in the gear box 268. This shaft 272 is provided at its lower end with a gear 273 which meshes with the gear 260. As the gear 260 is relatively long in a direction parallel to its axis of rotation, it will mesh with the gear 273 in all positions of the piston 244, so that the tool 255 will be rotated constantly as long as the motor 262 remains in operation.

For the purpose of supplying pressure to the interior of an article during the operation of the finishing tool 255, the tool is provided with a through passage 274 which communicates at its upper end with a longitudinal passage 275 in the shaft 257. The upper end of the shaft 257 is adapted to telescope within a pressure supply pipe 276, as illustrated in Fig. 15, whereby pressure may be supplied through the tool 255 from the pipe 276 at all vertical positions of the finishing tool and during its rotation. As seen in Fig. 22, the pipe 276 communicates with the main supply pipe 277, so that pressure is at all times supplied through the finishing tool. It may under some circumstances be desired to supply pressure through the finishing tool only at certain times in its operation. Under these circumstances, pressure may be supplied to the pipe 276 through the timer T and the supply of pressure may be timed as desired.

The function of this application of pressure is to cause the glass in the blow mold to be forced out to the shape of the mold in case it has been collapsed by the partial vacuum created in the completely closed body subsequent to the shearing and prior to the opening thereof, due to the cooling of the glass by heat transferred to the mold and the consequent contraction of the air therein.

*Timing and pressure controlling mechanism (Figs. 1 and 19 to 23)*

Timing means are provided in connection with this invention for synchronizing the operation of the feeder and machine portions of the apparatus. Combined with these means is a pressure controlling means for controlling, as desired, the application of pressure to and through the blow pipe 33 for blowing the bubble of glass.

As seen in Fig. 1, the cam shaft 13 is provided at one end with a sprocket wheel 278 which is connected by a sprocket chain 279 with a sprocket wheel 280 mounted upon a countershaft 281. The countershaft carries a spur gear 282 in mesh with a pinion 283 on a shaft 284 journaled in a suitable bearing in a bracket member 285. The timing means T is driven from the shaft 284 and thus is operated in timed relation to the operation of the feeder portion of the device.

Figure 19:
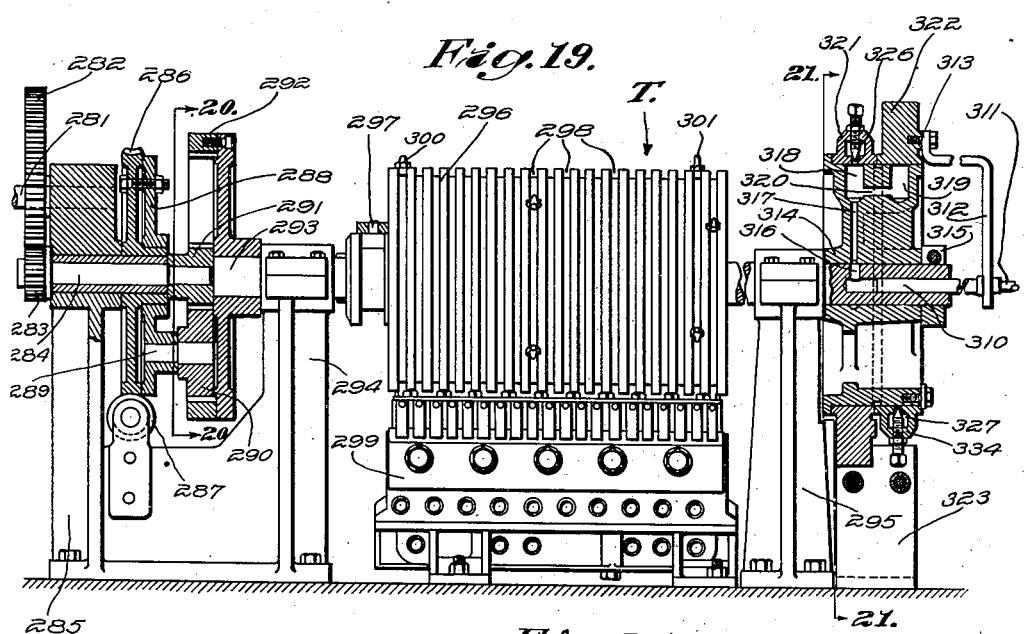
Fig. 19 is an elevational view with certain parts in vertical section of the timing mechanism for the machine and also of the puff blow controlling mechanism.
Figure 20:
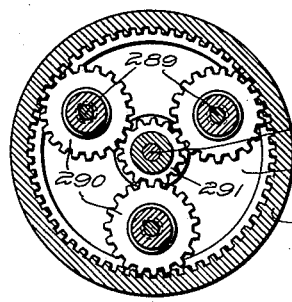
Fig. 20 is a vertical sectional view taken substantially on the line 20—20 of Fig. 19.

In order, however, to adjust the phase of operation of the machine portion with respect to that of the feeder portion, there is provided a phase changing device shown in detail in Figs. 19 and 20. This device comprises a worm wheel 286 freely mounted upon the shaft 284 or upon a sleeve surrounding this shaft, as seen in Fig. 19. The worm wheel 286 may be adjusted angularly about the shaft 284 by a worm 287 which may be manually rotated to change the phase relation between the feeder and the machine. The worm wheel 286 carries secured thereto a plate 288, which in turn carries a plurality of stud shafts 289 on which are journaled planetary pinions 290. These pinions mesh with a pinion 291 mounted upon the shaft 284 and also mesh with the inwardly directed gear teeth of a gear ring 292 secured to the timer shaft 293.

The shaft 293 is journaled in suitable bearings in brackets 294 and 295 and carries the timing drum 296 thereon. This drum is adapted to be clutched to the shaft 293 by a single tooth clutch device 297 of any well known construction. The timing drum and the valves operated thereby, and their method of operation, are preferably the same as or similar to the construction shown and described for the timer C in the British Patent 257,637 to Rushen and also in the U. S. patent to Ingle, No. 1,843,159, granted Feb. 2, 1932. Briefly, this drum 296 is provided with a plurality of undercut grooves 298 in each of which one, two or more buttons may be secured in any angularly adjusted position about the drum for the purpose of opening or closing corresponding valves in the valve box 299. There is one valve in the box 299 opposite to each of the grooves 298 and in each of these grooves there may be a short button, as shown at 300, for the purpose of opening the corresponding valve to admit pressure from the interior of the box 299 to the particular supply line corresponding to this valve, which pressure continues to flow to this supply line until the corresponding valve or a latch which holds it open is engaged by a long button as shown at 301.

Inasmuch as the particular construction of the valves forms no part of my present invention, it will not be further illustrated or described herein, but reference may be had to the aforesaid U. S.

Patent No. 1,843,159 for a more complete disclosure thereof. As hereinafter to be described, some one or more of the valves may be for the purpose of controlling vacuum to one or more of the supply lines, in which case the lines used for this purpose are segregated from the remainder of the lines and the portion of the valve box 299 into which they open is separate from the rest of the box, so that the vacuum line to the vacuum tank will at no time be open to the atmosphere or to pressure. The valves in box 299 are preferably so arranged that when they do not open their corresponding pipe to pressure, they open it to exhaust so as to exhaust the mechanism to which their corresponding pressure pipe may be connected whenever pressure is cut off from such pipe. Similarly, there may be segregated portions of the box 299 for controlling gas to one or the other of the burners used, if desired.

As seen in Fig. 22, the valve box 299 communicates with he main air pressure supply pipe 277 through the passage 302 which opens into a common chamber in the box 299 into which all the valves open with the exception of those communicating with certain segregated chambers for particular purposes, as above set forth. One of these segregated chambers is shown in Fig. 22 as being supplied with vacuum through the passage 303, the passage from this chamber being numbered 304 and communicating with the blow pipe 33. In place of the vacuum connection to line 303, this line may also be segregated from the rest and open to the atmosphere, if it is merely desired to exhaust the blow pipe instead of admitting vacuum thereto. The several passages 109, 112, 118, 247 and 248 communicate with individual valves in the box 299 and are supplied with pressure and exhausted at the desired times by suitably positioned buttons 300 and 301 in the grooves 298 of the drum 296 opposite their respective valves.

The showing in Fig. 23 is of certain additional mechanisms which are preferably timed from the timer T for the modified form of the device shown in Figs. 16 and 17, that is, that form in which a double neck ring is used and also in which is used pick-off mechanism as above described. As shown, the cylinder 172 which operates the secondary neck ring 149$^b$ communicates with individual valves in the valve box 299 through passages 305 and 306, these lines being opened to pressure or exhaust at the desired times. Pressure lines 216 and 217 for operating the cylinder of the fixed pick-off device communicate with individual valves in the timer. It will be understood that when using either the movable pick-off, or the machine without either pick-off device, these lines will be omitted. Also, in Fig. 23 there is shown the passage 215 from the pick-off head communicating with two valves in the valve box 299. This is so the pick-off head may be opened either to vacuum through the passage 307 or pressure through the passage 308. In this connection, a segregated valve chamber will be provided opposite the vacuum line 307 and will be supplied with vacuum through the passage 309. Similarly, the burner 203 is shown as supplied with combustible fluid and combustion supporting fluid through the passages 218 and 219, which may communicate with segregated chambers in the timer box 299. As before stated, certain of these connections may be omitted in a manner which will be clear to those skilled in the art.

*Pressure control means for the blow pipe*

Figure 21:
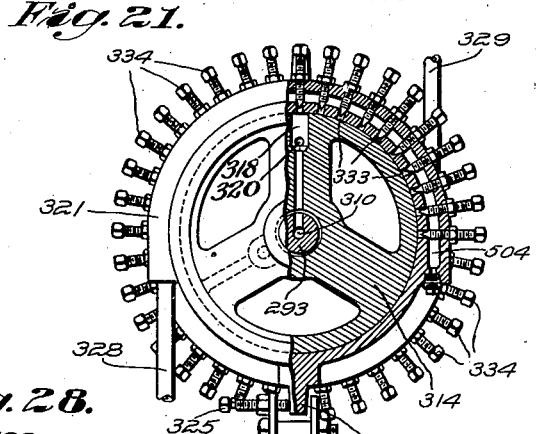
Fig. 21 is an elevational view with parts broken away and in vertical section, the view being taken substantially on the line 21—21 of Fig. 19.

There is preferably provided a means for controllably timing the admission of pressure to the blow pipe 33 for developing the bubble beneath the orifice, this means being shown particularly in Figs. 19 and 21.

As seen in Fig. 19, the shaft 293 which carries the timing drum 296 is extended to the right of the bearing in bracket 295, and at its right hand end (as seen in Fig. 19) is provided with an axial bore 310 into which extends a pipe 311 communicating with the blow pipe 33, as seen in Fig. 22. This pipe 311 is preferably steadied by a bracket 312 secured to a fixed part of the apparatus at 313. Secured to the extended portion of the shaft 293 at the right of the bearing in bracket 295, is an annular member 314 which is keyed to the shaft 293 or otherwise secured thereon, and is held from moving axially of the shaft by a suitable collar 315. The bore 310 communicates through a lateral passage 316 with a radially extending passage 317 in the member 314, which passage communicates with chambers 318 and 319 open to the outside of the annular member 314 and communicating with each other through one or more passages 320.

Arranged around the annular member 314, but prevented from rotation with this member, are a pair of annular members 321 and 322 each carrying a plurality of needle valves controlling a corresponding number of inwardly directed passages. While it might be possible to construct both these members as a single member, the present construction may in some cases be desirable for ease of manufacture. The members 321 and 322 are supported upon the annular member 314 and are prevented from rotating therewith by suitable bracket members 323 engaging extensions depending from the lower portions of members 321 and 322 respectively, as indicated in Fig. 21. As shown in this figure, the extension 324 of the member 321 is prevented from rotation by the abutting set screws 325. It will be understood that some similar mechanism may be used in connection with member 322 for preventing its rotation.

Members 321 and 322 are provided with semi-annular chambers 326 and 327 respectively, which communicate with the source of fluid pressure through pipes 328 and 329 respectively. As seen in Fig. 22, a suitable air chamber 330 and/or pressure reducing mechanism 331 are introduced between the chambers 326 and 327 and the main pressure supply line 277. Suitable valves, such as 332, may also be introduced in this line or elsewhere in the device as may be needed. The inner walls of chambers 326 and 327 are each provided with a plurality of openings as shown at 333, each of these openings being controlled by a separately adjustable needle valve 334 formed as a pointed bolt threaded into the outside of the chamber casing and locked in adjusted position by a suitable jam nut.

Thus, as the chambers 318 and 319 pass the several openings 333 in succession, there will be supplied thereto a plurality of discontinuous puffs, each of which is independently adjustable, the adjustments being such that they can be effected during the continued operation of the machine. In practice only some of these openings 333 may be open at all, as it may, and often is desirable, to keep many of them, sometimes every other one, for example, closed and by the remainder, control the admission of pressure to the blow pipe 33 to develop the bubble. In this way, pressure to the blow pipe may be very accurately controlled as to the amount of pressure, the duration of the application thereof, the continuity, and any and all other characteristics to as great an extent as could be done by manual operation of a blow pipe, as was used in the old hand art. In addition, the present construction will automatically provide exactly the same conditions for each succeeding article being formed.

PROCESSES CARRIED OUT BY THE MACHINE AND OPERATION OF THE MACHINE PARTS TO CARRY OUT THESE PROCESSES

*The simple auto blow process including flame piercing (Figs. 43 to 52)*

As shown in Figs. 43 to 52 and for the moment disregarding any movements or lack of movements of the plunger and blow pipe, such as is shown in certain of those figures, the "auto blow" process includes first, the flowing of glass through a downwardly directed orifice, the start of which is shown in Fig. 43. At the start there is little or no semblance of a bubble, but the glass is almost solid in passing downwardly through the orifice with perhaps a slight bubble formed at the lower end of the blow pipe 33 by the admission of a very slight amount of air or possibly by the expansion of the air already in the blow pipe. In Fig. 44, the bubble is shown considerably developed and more glass has passed downwardly through the orifice. In Fig. 45, the bubble is shown still further developed and substantially in the position at which it may be enclosed within the mold. Inasmuch as this series of figures, that is, 43 to 52, is intended also to show the forming of a bubble as aided by movement of the blow pipe, the bubble is shown in Fig. 45 as having a neck portion of greater diameter than the neck portion of the mold which must be closed around it. This neck portion is attenuated and narrowed down by the upward movement of the blow pipe, as seen by comparison of Figs. 45 and 46. As will appear later, however, the distribution of the glass in the bubble and the shape of the bubble may be controlled by a number of different factors, one of which is the movement of the blow pipe. In Fig. 46, the mold is shown closed around the bubble without any materially greater expansion of the bubble than in the step shown in Fig. 45. In Fig. 47 the bubble is shown blown out to the shape of the mold 136 and neck ring 149. In this figure, the blow pipe is shown again lowered to cause the down flow of sufficient glass around the top of the mold for the succeeding operation, this additional glass not being necessary, however, under certain circumstances. In Fig. 48, the blow pipe is shown again raised to some extent, retracting some of the glass upwardly into the orifice and causing a thinned portion at about the desired point of severance, as shown clearly in this figure by the diagrammatically illustrated shear blades 79 and 80. Fig. 49 shows the step of the process at the time of severance, showing how the shears seal the glass in the mold into a completely closed hollow body and also seal the end of the glass depending through the orifice to seal the bubble at the lower end of the blow pipe.

This sealing of the glass in the mold is not desirable, but it is inevitable with the use of shears of the type shown, it being substantially impossible to shear through an annular wall of hot plastic glass without sealing the ends of this wall. Due to the upward movement of the blow pipe, as seen by a comparison in Figs. 47 and 48 however, the wall at the point of severance is thinned down so that a thick bunch of glass sealing the top of the article in the mold is prevented. The effect of the shears in sealing the glass depending through the orifice is beneficial and provides for the subsequent action which includes the further retraction of the blow pipe to retract the glass upward into the feeder bowl and thereby to reheat the chilled severed portion of glass. The bubble beneath the blow pipe may be substantially completely collapsed for assisting in this reheat by the application of vacuum to the blow pipe, the effect of which will be seen by a comparison of Figs. 49, 50 and 43. The glass in the mold after the severance is shown in Fig. 50 where the top portion is sealed, as shown at 335.

In Fig. 51, there is shown the simple flame piercing means which includes the downwardly directed burner 178 which melts the center portion of the glass where it is sealed at 335, and causes the substantially molten glass at the edges of the opening thus formed to draw away, due to surface tension effects, thus forming an opening substantially the same size as the desired neck of the bottle. In Fig. 52 is shown the last step in the process in which the finishing tool 255 is moved downwardly into the neck to finish the inside or "corkage" thereof and the presser plate 251 serves at the same time to form the top or "finish" portion of the neck in cooperation with the neck ring 149. This completes the article which may then be removed from the mold in any suitable or well known manner.

*Process of article formation by the auto blow method, including pick-off, (Figs. 43 to 50 and 30 to 34)*

In forming articles by the auto blow method and finishing them by the use of the pick-off, the apparatus of which is described above, the steps of forming the complete enclosed hollow article within the molds may be carried out in exactly the same manner as that above described in connection with the flame piercing method and shown, for example, in Figs. 43 to 50. Starting now with Fig. 30, which is at substantially the same point in the process as that shown in Fig. 50 above discussed, we may finish the article by the use of "pick-off" method.

When using this method, however, it is desirable that a neck ring 149ª having a particular internal configuration be provided, that is, one in which the uppermost portion of the neck ring cavity which forms the finish of an article is formed with an outwardly extending horizontal annular wall contiguous with a substantially vertical extending wall at a sharp corner, as shown at 336 (Fig. 30). This configuration for the neck ring will provide for a distribution of glass in a peculiar fashion, that is, the over blow of the glass bubble formed at the step of the process shown in Fig. 48 will cause a wall of glass, as shown at 337 in Fig. 30, to overlie the horizontal wall, and as this glass is spreading outwardly, the greater area thereof will cause the glass to be of much less thickness. Inasmuch as the neck mold 149ª is materially cooler than the glass, this relatively thin wall of glass 337 will be chilled to a substantially greater extent than the remainder of the hollow glass mass and will be substantially rigid prior to the pick-off action, later to be described.

Considering now another characteristic of glass in contact with a mold, such as the mold 149ª, it is found that when glass overlies a sharp shoulder, such as that shown at 336 in Fig. 30, the glass adjacent to this shoulder is hotter than that adjacent either of the contiguous walls, inasmuch as there is little or no area of cooler metal by which the heat at this shoulder portion may be abstracted. As a result, when the top sealing portion 237 of the glass is engaged by the pick-off head 192 or 192ª, as shown in Figs. 31 and 32, the portion 337 of the glass being relatively rigid, for reasons explained above, will be removed by the pick-off head, and the portion of glass opposite the shoulder 336 being relatively hot, will stretch to form the thinned annular wall 338, as shown in Fig. 31. This thinned wall portion, being subjected at this time to the action of the burner 203, will be easily severed, as seen by a comparison of Figs. 31 and 32, and the continued action of the burner will be effective to reheat the neck portion of the article and smooth up the somewhat irregular severed edge, as seen in Fig. 32.

When using but a single neck ring, such as 149ª, in connection with the pick-off method, this neck ring is preferably cracked during the period of time immediately after the severance of the wall 338 for the reheat of the neck portion of the glass, that is, for permitting the heat of the glass at the interior portions of the wall of the neck to work outwardly and soften the outer skin thereof which has been chilled by contact with the cooler neck mold. After sufficient time has elapsed for this reheating operation, the neck mold is again closed and the finishing of the neck completed.

*Variation of the auto blow process using the pick off incident to the use of two neck rings of different shapes. (Figs. 30 to 34)*

The process described above for forming articles by the auto blow process accompanied by the use of pick-off means, such as those described, for forming the neck opening into the article, may be further varied by using a preliminary neck ring such as that shown at 149ª in Figs. 30 to 32 in which the neck portion of the article is given a preliminary configuration, this preliminary neck ring being used in cooperation with the pick-off head 192 for removing the upper sealing portion of glass as shown at 237 in Fig. 32. The subsequent formation of the neck may in some instances be more advantageously accomplished by the use of a secondary neck ring having a somewhat larger internal cavity than that of the primary neck ring and having its walls extended up above the top finish of the article to be formed, as shown at 149ᵇ in Figs. 33 and 34. When using this construction the process carried on is exactly the same as that just described with the exception that instead of again closing the original neck ring 149 or 149ª, about the neck of the article as above described, the original or primary neck ring 149ª is opened wide for the reheat and the secondary neck ring 149ᵇ is closed about the article, as seen in Fig. 33. The reheat may continue after the closing of the secondary neck ring, due to the fact that it is larger than the neck portion of the article and does not contact therewith. The "finish" of the article may be formed in the same way as described above with the exception that the finishing tool must be provided with the plate 251ª of slightly different contour than the plate 251 above described.

Due to the fact that a completely closed article of hot glass in contact with the cooler walls of a mold is constantly losing heat and thus having its temperature reduced, the air in such closed body of glass is being cooled and therefore contracts. This has a tendency to cause a collapsing of the walls of the article which may assist in the formation of the neck opening by the piercing flame, as shown in Fig. 51, and also may assist in the severance of the wall 338, as shown in Figs. 31 and 32. It has also an undesirable effect in that it may tend to cause the walls of the article to draw away from the walls of the mold 136, so that means are preferably provided for counteracting this last undesirable effect. These means comprise the means for admitting blowing pressure through the neck finishing tool, as shown in Figs. 14 and 15, the construction and operation of which has previously been described.

ADJUSTMENTS FOR THE DEVICE AND RESULTS THEREOF

*Means for controlling the flow of glass*

The flow of glass through the orifice may be controlled in a variety of different manners as set forth above in connection with the description of the feeder portion of the machine and also in the Peiler Patent 1,760,254 above referred to. In the first place, it may be controlled by varying the head of glass over the orifice. This may be varied as set forth by Peiler by the usual and well-known means of a gate provided between the furnace and the forehearth, such a gate not being shown in the accompanying drawings. In the second place, the head of glass above the orifice may be varied by the position of an annular member positioned above the orifice and having its axis in alignment therewith and depending into the glass. Such annular members may be considered as either the plunger 9 or the sleeve 8. As set forth above, means are provided for adjusting the vertical position of each of these members, assuming in this instance, that the plunger 9 is maintained stationary rather than moved.

The flow of glass may also be controlled by varying the characteristics of the orifice assuming the various parts of the feeder to be stationary. In the first case, the plunger or the sleeve may be adjusted vertically as previously explained to vary the constriction of the orifice and thus vary the flow of glass therethrough. In the second place, the blow pipe may be stationary with its lower end either above or below the orifice, thus varying the effective area of the orifice through which the glass may flow by gravity or otherwise.

The characteristics of the bubble of glass formed beneath the orifice may be varied by varying the resistance to downward movement of the bubble, for example, by the positioning of the bottom plate 148 of the mold at such a height that the bubble will contact therewith prior to the closing of the mold. This may be accomplished by varying the vertical height of the machine as a whole, by varying the height of the rails 89 with respect to the supporting structure (see Fig. 1).

The flow of glass through the orifice may also be controlled by moving the plunger 9, as above described, which is from one point of view equivalent to varying the effect of gravity upon the glass. As above described, the characteristics of the plunger stroke may be varied as to range, that is position of the stroke, amplitude, and the form of the stroke, the means for accomplishing such variations being fully explained above.

Similar variations of the flow of glass may be accomplished by regulating the movements of the blow pipe 33. The means have been fully explained above by which the characteristics of the blow pipe movements may be varied as to range, amplitude and form.

The variations of the position, range of movement, etc. of the blow pipe are accompanied by novel results, as the blow pipe is supplying blowing pressure to the depending bubble during at least a part of its movements and thereafter is expanding that bubble to the shape of the mold. Hence, variation of the characteristics of movement and position of the blow pipe at different stages in the development of the bubble controls the characteristics of that bubble and hence the distribution of the glass throughout the finished article. For example, a variation in the position of the stroke of the blow pipe made without change in the application of blowing pressure through the blow pipe will vary the amount of glass below the blow pipe at the time of starting of the bubble, and hence in accordance with the principles illustrated by Figs. 35 to 42 will vary the distribution of glass from bottom to top of the article.

Other instances of the novel effects of variations of the blow pipe position or movements will be suggested from the foregoing, as for example, a positioning of the blow pipe eccentric of the orifice will vary the lateral distribution of the glass in the completed article.

Furthermore, variations of the position or movements of the plunger and/or of the sleeve effect variations in the coaction thereof with the blow pipe and with the application of air therethrough, and thus vary the characteristics of the bubble, which in turn determine the distribution of the glass in the final article. These effects are readily distinguished from the effects obtained in the prior art by the use of adjustable plungers and sleeves in the feeding of solid charges of glass, in that in the auto-blow process, to which this invention is directed, a novel coaction exists between the instrumentalities which determine the rate of flow through an orifice and the expansion of the bubble, not present in the feeding of solid charges.

In disclosing the cycle of operations of the device to form an article by the use of the flame piercing method, certain results and the effects of movement of the blow pipe have been set forth. It is believed, therefore, that no further description need be given of these effects, as all desirable results possible by the use of the several adjustments disclosed herein are within the scope of my invention.

*Means for controlling the temperature of the glass at the orifice*

The temperature of the glass in the feeder bowl above the orifice may be controlled in a variety of manners, some of which are known in the prior art as illustrated by the Peiler patent above referred to. This temperature may also be controlled to a major extent by varying the rate of heat withdrawal from the space above the feeder bowl. This may be done in the present instance by controlling the position of the damper 7 to control both the outflow of gases through the stack 6 and also the rate of radiation of heat out the stack opening.

The temperature of the glass above the orifice may also be controlled, or perhaps to describe it more accurately, be maintained at the desired point and uniformity by circulating the glass from the cooler region in the forehearth toward a hotter zone or adjacent to the feeder bowl. This may be accomplished by controlling the length and character of flame from the burners used to supply heat to the forehearth which may be done by suitable combustion controlling means, including the damper 7 (Fig. 4), such means and method being disclosed in the aforesaid Peiler patent.

*Controlling the discharge of glass by controlling the speed of operation*

In handling viscous fluids, such as molten glass, the rate of flow of the fluid has a definite time factor for any given glass composition, temperature and resultant viscosity. Thus, by varying the speed of operation of the device as a whole, which will be accomplished by varying the reducing ratio of the speed changing device 15, the rate of discharge of glass and the characteristics of the bubble formed therefrom will be varied. In the majority of cases, the speed of operation of the device as a whole cannot be varied without making other and compensating adjustments of certain of the operating means particularly in the rate of supply of puff blowing air to the blow pipe 33. No attempt will be made herein to explain all of these inter-relations, as they are determined or varied according to the character of the glass used, its temperature, the type and size of the article to be formed and many other factors.

*Variation in the characteristics of the application of blowing air to the blow pipe*

As above set forth, in describing the puff blowing mechanism shown in Figs. 19 and 21, the characteristics of the application of puff blowing pressure to the blow pipe 33 may be varied in an infinite number of different ways. By varying the timing of the application of pressure, many results may be had, such as are shown for example in the two series of functional diagrams shown in Figs. 35 to 38 and 39 to 42, respectively.

In Fig. 35 it will be observed that practically no air has been admitted through the blow pipe 33 until a material amount of glass has passed down through the orifice. At this time air is supplied in fairly large amount, which will distend the glass laterally to a greater extent than vertically as seen in Fig. 36. Air may then be supplied at a moderate rate to provide for the next step, Fig. 37, with the resultant distribution of glass as seen in Fig. 38 in which an article is formed having a relatively thick lower portion and a relatively thin upper portion.

Exactly the opposite results from the point of view of distribution of glass in the final article may be obtained, as shown in the series of diagrams in Figs. 39 to 42, inclusive. As seen in Fig. 39, air pressure is continuously supplied at a low rate during the time the glass is flowing downwardly through the orifice to form an elongate bubble having a relatively thin bottom. When this bubble is distended, as shown in Fig. 40, the lower portion thereof has thinner walls than the upper portion, with the results seen in Figs. 41 and 42 that an article is formed having a thicker upper portion or shoulder than the bottom portion.

Obviously by suitable regulation of the application of pressure, any intermediate distribution of glass in the bubble may be had. The characteristics of the article to be formed determine the type of blowing which must be used in forming this article and vice versa. The present process is, therefore, applicable to the formation of articles difficult if not impossible of formation by prior automatic methods.

One of the advantageous results of the use of the "auto blow" process for manufacturing glassware is this ability to produce articles having any desired distribution of glass in the walls, and also articles having much thinner walls than has been heretofore practicable in the operation of previously known types of automatic glass manufacturing apparatus. The direct result of this, from the point of view of the "auto blow" process, is that articles may be formed having walls which are only thick enough to give the required strength, it being unnecessary to give excessive thickness in one part of an article in order that some other part may be sufficiently thick to have the necessary mechanical strength for the article as a whole, which is the common fault in ordinary machine-made articles of certain types and forms. This results in the saving of glass which represents a very material proportion of the cost of manufacturing glass articles at the present time, so that by the "auto blow" process hereinbefore explained, it is possible to effect economies in the manufacture of glassware not possible with previous types of apparatus.

Miscellaneous other adjustments

Various other means and adjustments, the structural embodiments of which have been heretofore explained, will effect the characteristics of the bubble of glass being formed for the production of glass articles. For example, the time during which the shears remain closed after the severance of the bubble of glass from the tail of glass depending through the orifice will have an effect upon the distribution of the next succeeding article. This time is a function of the configuration of the shear cam (the description of which is incorporated in the Peiler patent aforesaid). Also, the bubble may be permitted temporarily to rest upon the shears to be flattened out to some extent and the lower end portion chilled by contact with the shears, and at the same time glass may be permitted to flow downwardly through the orifice to form an article having a relatively thick lower portion, in a manner similar to that disclosed in the diagrammatic manner described in Figs. 35 to 38 inclusive. The speed of the shears while cutting through the glass, which is controlled by the shape of the shear cam, may also be used to give a tapering configuration to the upper severed portion of the article or an action which is known in the trade as "whittling". Bubbles having tapered upper portions formed by a relatively slow shearing operation are peculiarly adapted for the formation of certain types and shapes of glass articles in a manner which will be apparent to those skilled in the art.

By varying the cutting plane of the shears vertically below the orifice, the characteristics of the articles may be varied as this will vary the characteristics of the next succeeding article, due to the formation of this next article from glass which is maintained a material time depending through the orifice and thus is somewhat chilled during this time.

For the formation of certain types of ware having unequal lateral dimensions, and/or configuration, it may be desired to have the mold in which the article is to be formed slightly out of vertical alignment with the feeder orifice, so that the bubble of glass depending from the orifice will be disposed within the mold in an off-center position. This result may be accomplished by forming the cavity of the mold off center with respect to the normal center thereof in a way which will be obvious to those skilled in the art. Ware of this type may also be produced by forming an unequally distributed bubble, which may be accomplished by adjusting the position of the sleeve, plunger or blow pipe, or several of these parts, to one side or the other, or in some off-center position with respect to the orifice. The means for accomplishing such adjustments have heretofore been described, certain of them being disclosed by Peiler. Unequally distributed articles may also be produced by varying the position of the point of severance from the glass bubble from the glass depending from the orifice by adjusting the screws 85 and 86, seen in Fig. 6, to cause the shears to sever the glass at a point out of vertical alignment with the orifice.

In general the various adjustments may be used as may seem most desirable to the operator as a result of the experience which he may have with the use of the construction and the process herein disclosed, and no fixed rule may be laid down as to what adjustments should be made for accomplishing certain objects. It is contemplated, however, that any or all of the adjustments disclosed herein may be employed and suitably used to carry out and accomplish any desired results.

While I have shown and described a certain limited number of modifications of the construction of a machine and methods which I contemplate using in connection with my invention, it is to be understood that any and all modifications coming within the scope of the appended claims are to be considered within the purview of my invention. Many of the individual instrumentalities, or methods and sub-combinations thereof may be useful in various relationships, all of which are to be considered within the scope of the invention. I do not wish to be limited therefore in any respect except by the scope of the appended claims, which are to be construed as broadly as the state of the prior art permits.

I claim:

1. The combination with a receptacle for molten glass having a submerged downwardly opening discharge orifice, of means for severing successive glass masses from glass depending through said orifice, comprising means for simultaneously severing the glass depending through said orifice at two vertically spaced points both of which are spaced below said orifice.

2. The combination with a receptacle for molten glass having a submerged downwardly opening discharge orifice, of means for severing successive glass masses from the glass depending through said orifice, comprising a plurality of cooperating shear members mounted for substantially horizontal movement below said orifice for simultaneously severing the glass at two vertically spaced points, and means for operating the shear mechanism to cause the point of severance of the glass to be laterally offset from a perpendicular extending through the center of said orifice in the direction of the uppermost of said cooperating shear members.

3. The combination with a receptacle for molten glass having a submerged downwardly opening discharge orifice, of means for severing successive glass masses from the glass depending through the orifice, comprising reciprocable shear supporting members one at each side of said orifice and spaced therebelow, two superposed shear members attached to one of said shear supporting members and a single shear member attached to the other of said shear supporting members and cooperating with said first two named shear members, whereby to sever the glass depending from said orifice simultaneously at two vertically spaced points.

4. The combination with a receptacle for molten glass having a submerged downwardly opening discharge orifice, of means for severing successive glass masses from the glass depending through the orifice, comprising a stationary shear supporting structure, a pair of shear supporting arms pivotally mounted on said structure and mechanically interconnected for simultaneous movement toward and away from the glass depending through said orifice, a pair of superposed shear members each of which has one edge beveled and both of which are secured to the outer end of one of said shear supporting arms, the bevels of said shear members being disposed away from one another, a single shear member secured to the other of said shear supporting arms and having a substantially vertical cutting edge, whereby to cooperate with both the first named pair of beveled shear members and pass between them to shear the glass depending through the orifice at two vertically spaced points, and means for operating the shear supporting arms to cause their simultaneous movement for shearing the glass.

5. Apparatus for making blown glassware, comprising a receptacle for molten glass having a submerged downwardly opening discharge orifice, an annular member having its axis substantilaly in vertical alignment with the orifice and depending into the glass thereover for controlling the flow of glass through the orifice, a blow pipe having its axis disposed substantially in vertical alignment with the orifice and extending through said annular member, independent means for supporting said blow pipe and said annular member, a mold adapted to be positioned beneath the orifice, and means for supplying fluid under pressure to said blow pipe to blow the glass depending through the orifice into a bubble and thereafter to blow the bubble to conform to the shape of said mold, the last named means comprising an annular chamber to which pressure is continuously supplied, a rotatable member mounted within said annular chamber and having an outwardly directed port communicating with the blow pipe, a series of apertures communicating between the interior of said annular chamber and the inside wall thereof and adapted to be successively opposite the port in said rotatable member, and independent means for variably constricting each of said apertures, whereby to provide a discontinuous series of puffs of independently controllable amounts of fluid pressure to be supplied to the blow pipe, and means for severing the glass in said mold from the glass depending through the orifice after the blowing has been completed.

6. Apparatus for making hollow blown glassware comprising a mold, a blow pipe, means for supplying fluid under pressure to and through said blow pipe to blow a bubble of glass to conformity with the internal cavity of said mold, shearing means for severing the glass within said mold from the glass on and around said blow pipe, the shearing means operating at a level adjacent to the top of the mold to sever the glass therein from the parent body of glass and to seal the top of the glass article in said mold to form a completely enclosed hollow body of glass, means operating after the completion of the severing operation and while the glass is still plastic to break said seal at the top of the mold to provide a neck opening for the article in said mold.

7. Apparatus for making hollow blown glassware, comprising a mold, a blow pipe, means for supplying fluid under pressure to and through said blow pipe to blow a bubble of glass to conformity with the internal cavity of said mold, shearing means for severing the glass within said mold from the glass on and around said blow pipe, the shearing means operating to seal the top of the glass article in said mold to form a completely enclosed hollow body of glass, pick-off means, means to move said pick-off means to a position to engage the top sealing portion of the glass at the top of the mold, means for causing said pick-off means to hold the glass engaged thereby while it is still plastic and without shattering it, and means for actuating the pick-off moving means gradually to cause said pick-off means to move away from said mold carrying with it the top sealing portion of the glass held thereby, whereby to provide a neck opening for the article in said mold, and whereby to remove that portion of the glass which was directly acted upon by the shearing means.

8. Apparatus for making hollow glassware, comprising a mold, a blow pipe, means for supplying fluid under pressure to and through said blow pipe to blow a bubble of glass to conformity with the internal cavity of said mold, shearing means for serving the glass within said mold from the glass on and around said blow pipe, the shearing means operating to seal the top of the glass article in said mold to form a completely enclosed hollow body of glass, pick-off means including a glass engaging head for removing the top sealing portion of the glass above said mold to provide a neck opening therein, and means for relatively moving the pick-off head and the mold in the direction of the longitudinal axis of the latter after the pick-off head has engaged the glass for removing the top portion of glass from the remainder of the glass in said mold.

9. Apparatus for making hollow blown glassware, comprising a mold, a blow pipe, means for supplying fluid under pressure to and through said blow pipe to blow a bubble of glass to conformity with the internal cavity of said mold, shearing means for severing the glass within said mold from the glass on and around said blow pipe, the shearing means operating to seal the top of the glass article in said mold to form a completely enclosed hollow body of glass, pick-off means including a glass engaging suction head for removing the upper sealing portion of the glass to provide a neck opening into the article in said mold, means for moving the pick-off head vertically with respect to said mold after it has engaged the glass therein, and means operable in timed relation to the movement of the pick-off head for applying suction thereto for retaining the glass against the head after it has been engaged thereby and for thereafter breaking the suction for the release of the glass by said head.

10. Apparatus for making hollow blown glassware, comprising a mold, a blow pipe, means for supplying fluid under pressure to and through said blow pipe to blow a bubble of glass to conformity with the internal cavity of said mold, shearing means for severing the glass within said mold from the glass on and around said blow pipe, the shearing means operating to seal the top of the glass article in said mold to form a completely enclosed hollow body of glass, a pick-off head for engaging the top sealing portion of the glass above said mold, means for then moving said head vertically away from said mold and thereby forming a thinned section of glass intermediate the portion of the glass engaged by said head and the glass in said mold, and means for serving the glass engaged by said head from the glass in said mold at the thinned section, whereby to provide a neck opening into the interior of the article in said mold and whereby to remove from the article that portion of the glass which has been directly engaged by the shears.

11. Apparatus for making hollow blown glassware, comprising a mold, a blow pipe, means for supplying fluid under pressure to and through said blow pipe to blow a bubble of glass to conformity with the internal cavity of said mold, shearing means for severing the glass within said mold from the glass on and around said blow pipe, the shearing means operating to seal the top of the glass article in said mold to form a completely enclosed hollow body of glass, a pick-off head for engaging the top sealing portion of the glass above said mold, means for then moving said head vertically away from said mold and thereby forming a thinned section of glass intermediate that portion of the glass engaged by said head and the glass in said mold, and means for severing the glass engaged by said head from the glass in said mold at the thinned section including an annular burner arranged substantially concentric with the neck portion of said mold and adapted to project a flame toward the thinned section of glass formed by the action of the pick-off head, whereby to sever the glass at the thinned section and also to smooth the severed edge of the glass forming the neck end of the article and reheat the same.

12. Apparatus for making hollow blown glassware, comprising a mold, a blow pipe, means for supplying fluid under pressure to and through said blow pipe to blow a bubble of glass to conformity with the internal cavity of said mold, shearing means for severing the glass within said mold from the glass on and around said blow pipe, the shearing means operating to seal the top of the glass article in said mold to form a completely enclosed hollow body of glass, pick-off means including a glass engaging suction head for removing the upper sealing portion of the hollow body of glass to provide a neck opening therein, means for moving said head vertically with respect to said mold after it has engaged the glass therein to provide a thinned section connecting the glass engaged by said head with the glass in said mold, an annular burner positioned substantially concentric with said head for severing the glass engaged by said head from the glass in said mold at the thinned section and for assisting in reheating the neck portion of the glass in said mold, means for applying suction to said head in timed relation to the movements thereof for retaining the glass in engagement therewith and for thereafter breaking the suction for the release of the glass on said head after the severance has been effected by said burner, and means for supplying fluid fuel to said burner.

13. Apparatus for making hollow blown glassware, comprising a mold, means for moving said mold in an orbital path having dwell positions, a blow pipe adapted to be positioned above and substantially in vertical alignment with said mold at one of said dwell positions, means for supplying fluid under pressure through said blow pipe to blow a bubble of glass to conformity with the internal cavity of said mold, shearing means also located at said one dwell position for severing the glass within said mold from the glass on and around said blow pipe, the shearing means operating to seal the top of the glass article in said mold to form a completely enclosed hollow body of glass, a vertically movable pick-off head located at the other of said dwell positions and in vertical alignment with said mold for engaging and removing the top sealing portion of glass above said mold to provide a neck opening into the article therein, and an annular burner also disposed at said other dwell position and concentric with said pick-off head for severing the portion of the glass engaged by said head from the glass in said mold after said head has engaged the glass and moved said portion thereof vertically upward to provide a thinned section between the glass engaged by said head and the glass in said mold.

14. Apparatus for making hollow blown glassware, comprising a mold, a blow pipe, means for supplying fluid under pressure through said blow pipe to blow a bubble of glass to conformity with the internal cavity of said mold, shearing means for severing the glass within said mold from the glass on and around said blow pipe, the shearing means operating to seal the top of the glass article in said mold to form a completely enclosed hollow body of glass, means for supporting said mold and for moving it in a predetermined path, pick-off means, means to move said pick-off means to a position with respect to the mold to engage the top sealing portion of the glass at the top of the mold and during mold movement, means for causing said pick-off means to hold the glass engaged thereby while it is still plastic and without shattering it, and means for actuating the pick-off moving means gradually to cause said pick-off means to move away from said mold carrying with it the top sealing portion of the glass held thereby, whereby to provide a neck opening into the glass article in said mold.

15. Apparatus for making hollow blown glassware, comprising a receptacle for molten glass having a submerged downwardly opening discharge orifice, a blow pipe having its axis disposed substantially in vertical alignment with the orifice for blowing a bubble of glass integral with the glass in said receptacle and depending through said orifice, an intermittently rotated mold carrier adjacent said receptacle, a mold on said carrier and adapted for movement thereby in a circular path, one of the intermittent dwell stations of the mold being below and substantially in vertical alignment with the orifice, whereby the mold may enclose a glass bubble depending through said orifice, means to open and close said mold, means to supply fluid under pressure to said blow pipe to blow the glass bubble as aforesaid and to expand the bubble to conformity with the cavity of the mold after the mold has been closed about the partial expanded bubble, means for severing the glass in said mold from the glass depending through the orifice, the severing means being effective to seal the hollow mass of glass in the mold to form a completely enclosed hollow body of glass, means for intermittently rotating the carrier to move the mold from its dwell position beneath the orifice to another dwell position, pick-off means cooperable with the mold during its movement from its dwell position beneath the orifice to its next dwell position, means for moving said pick-off means as above set forth and for moving it to a position to engage the top sealing portion of the glass at the top of the mold during mold movement, means for causing said pick-off means to hold the glass engaged thereby while it is still plastic and without shattering it, and means for actuating the pick-off moving means gradually to cause said pick-off means to move away from said mold carrying with it the top sealing portion of the glass held thereby to provide a neck opening into the formed glass article within the mold.

16. Apparatus for making hollow blown glassware, comprising a receptacle for molten glass having a submerged downwardly opening discharge orifice, a blow pipe positioned in substantially vertical alignment with said orifice, means for supplying fluid under pressure through said blow pipe to blow successive bubbles of glass beneath and depending through said orifice, a plurality of molds mounted for movement in an orbital path a point on which lies beneath said orifice, whereby the molds may successively enclose the bubbles of glass depending through said orfice, means for successively severing the glass in said molds from the glass depending through said orifice and thereby sealing the tops of the masses of glass in said molds to form completely enclosed hollow bodies of glass, an oscillatory pick-off means arranged to cooperate with each of said molds in succession during mold movement, means for oscillating said pick-off means to cause it to move in cooperative relation with each mold in succession, means for moving said pick-off means relative to each mold during a part of their cooperative travel to position the pick-off means in proximity to the top sealing portion of glass above the mold, means for causing said pick-off means to hold the glass adjacent to which it is moved while such glass is still plastic and without shattering it, and means for actuating the pick-off moving means gradually to cause said pick-off means to move away from said mold carrying with it the top sealing portion of the glass held thereby to provide neck openings into the interiors of the hollow articles within the molds.

17. Apparatus for making hollow blown glassware, comprising a receptacle for molten glass having a submerged downwardly opening discharge orifice, a blow pipe positioned in substantially vertical alignment with said orifice, means for supplying fluid under pressure through said blow pipe to blow successive bubbles of glass beneath and depending through said orifice, a plurality of molds mounted for movement in an orbital path a point on which lies beneath said orifice, whereby the molds may successively enclose the bubbles of glass depending through said orifice, means for successively severing the glass in said molds from the glass depending through said orifice and thereby sealing the tops of the masses of glass in said molds to form completely enclosed hollow bodies of glass, an oscillatory pick-off means arranged to cooperate with each of said molds in succession to engage the top sealing portions of the glass at the tops of said molds and remove such portions therefrom to provide neck openings into the interiors of the hollow articles within the molds, said pick-off means including a suction head mounted for lateral movement with each of said molds in succession and for vertical movement with respect thereto, means to apply suction to said head when in engagement with the sealing portions of glass in the molds, cam operated means for thereafter moving said head vertically during and in response to the lateral movement of said molds, and an annular burner arranged substantially concentric with said head but not partaking of its vertical movement for burning through the thinned portion of glass connecting the sealing portion of the glass engaged by said head with the glass in said mold.

18. Apparatus for making hollow blown glassware, comprising a receptacle for molten glass having a submerged downwardly opening discharge orifice, a blow pipe having its axis disposed substantially in vertical alignment with the orifice, means for supplying fluid under pressure through said blow pipe to blow successive bubbles of glass beneath and depending through said orifice, a rotary carrier positioned adjacent to said orifice, a series of molds arranged around said carrier so that the path of their centers will pass substantially through a point in vertical alignment with said orifice, whereby the molds may be brought to a position to enclose bubbles of glass depending through said orifice, means for intermittently rotating the carrier to bring said molds successively to a dwell position substantially in vertical alignment with said orifice, means for successively closing said molds around the bubbles of glass depending through said orifice, means operable after closing of each mold around a bubble of glass to cause pressure to be applied to said blow pipe to expand each bubble of glass to the shape of the mold in which it is enclosed, means for then severing the glass within such mold from the glass depending through said orifice and thereby sealing the glass within each mold into a completely enclosed hollow body of glass, a pick-off head successively cooperable with each mold during the movement thereof from its dwell position beneath the orifice to its next dwell position for engaging and removing the sealing portion of glass at the top of the respective molds, means for mounting said head for oscillatory movement about the axis of rotation of said carrier, means for oscillating said head about said axis to cause it to cooperate with each mold successively, cam means for imparting a predetermined substantially vertical reciprocation to said head to cause it first to engage the sealing portion of the glass above each mold successively and then to draw away from the respective molds carrying with it the portion of glass engaged thereby, means for applying suction to said head to cause it to retain the glass engaged thereby during its movement away from the respective molds, whereby the glass of the sealing portions will be separated from the glass in the molds by thinned wall sections of glass, an annular burner partaking of the lateral oscillatory movements of said head but not of its vertical motion for burning through and thus severing the glass at the thinned wall sections upon the upward movements of said head, and means for supplying fluid fuel to said burner.

19. Apparatus for making hollow blown glassware, comprising a receptacle for molten glass having a submerged downwardly opening discharge orifice, a blow pipe having its axis disposed substantially in vertical alignment with the orifice and depending into the glass thereover a body mold adapted to be positioned beneath the orifice, a primary neck mold cooperable with said body mold, independent means for opening and closing said molds, means for supplying fluid under pressure through said blow pipe to blow a bubble of glass below and depending through said orifice, whereby the bubble so formed may be enclosed within said molds, said pressure supplying means being effective thereafter to supply additional pressure through said blow pipe to expand the bubble of glass to the form of said molds, means for severing the glass in said molds from the glass depending through said orifice and thereby sealing the top portion of the glass in said molds to form a completely enclosed hollow body of glass, pick-off means, means to move said pick-off means to a position to engage the top sealing portion of the glass at the top of the primary neck mold, means for causing said pick-off means to hold the glass engaged thereby while it is still plastic and without shattering it, and means for actuating the pick-off moving means gradually to cause said pick-off means to move away from said primary neck mold carrying with it the top sealing portion of the glass held thereby opening into the interior of the hollow body of glass, a secondary neck mold having an internal configuration shaped to form the neck portion of the article to be formed, means for substituting the secondary neck mold for the primary neck mold in cooperation with the body mold, and means for causing the neck portion of the glass to conform to the internal configuration of the secondary neck mold.

20. Apparatus for making hollow blown glassware, comprising a receptacle for molten glass having a submerged downwardly opening discharge orifice, a blow pipe having its axis disposed substantially in vertical alignment with the orifice and depending into the glass thereover, a body mold adapted to be positioned beneath the orifice, a primary neck mold cooperable with said body mold, independent means for opening and closing said molds, means for supplying fluid under pressure through said blow pipe to blow a bubble of glass below and depending through said orifice, whereby the bubble so formed may be enclosed within said molds, said pressure supplying means being effective thereafter to supply additional pressure through said blow pipe to expand the bubble of glass to the form of said molds, means for severing the glass in said molds from the glass depending through said orifice and thereby sealing the top portion of the glass in said molds to form a completely enclosed hollow body of glass, said primary neck mold having an internal configuration including a substantially vertically extending face contiguous with a substantially horizontal outwardly extending face to provide an upwardly and inwardly directed shoulder, whereby the bubble of glass blown in the body mold and primary neck mold will have a relatively thin portion overlying said horizontally extending face which will be relatively cool and rigid as compared with that portion of the neck of the glass adjacent said shoulder, a substantially vertically movable pick-off head for engaging and removing the top sealing portion of the glass, means for moving the head and the top sealing portion of the glass away from said molds to cause the glass adjacent to said shoulder to be drawn out to a thin vertical wall, means for severing the glass engaged by the pick-off head from the glass in said molds at the thinned wall portion, means for thereafter opening the primary neck mold for initiating the reheat of the neck portion of the article, a secondary neck mold cooperable with the body mold and having an internal cavity shaped in accordance with the desired neck configuration of the article being formed and having higher side walls than that of said primary neck mold, and means to cause the neck portion of the glass after it has been reheated as aforesaid to conform to the shape of the internal cavity of the secondary neck mold.

21. Apparatus for making hollow blown glassware, comprising a receptacle for molten glass having a submerged downwardly opening discharge orifice, a blow pipe having its axis disposed substantially in vertical alignment with the orifice and depending into the glass thereover, a body mold movable in an orbital path a point on which is beneath the orifice, a primary neck mold movable and cooperating with the body mold, means for supplying fluid under pressure through said blow pipe to blow a bubble of glass below and depending through the orifice and later to expand the bubble to the shape of said molds while they are positioned beneath the orifice, means for severing the glass in said molds from the glass depending through the orifice and thereby sealing the glass in the molds into a completely closed hollow body, pick-off means, means for moving said pick-off means to a predetermined position with respect to the blow mold and primary neck mold to engage the top sealing portion of the glass above the primary neck mold, means for causing said pick-off means to hold the glass engaged thereby while it is still plastic and without shattering it, and means for actuating the pick-off moving means gradually to cause said pick-off means to recede from said molds carrying with it the top sealing portion of the glass held thereby to provide a neck opening into the interior thereof, a secondary neck mold cooperable with the body mold after the formation of the neck opening into the glass therein, means for substituting the secondary neck mold for the primary neck mold in cooperation with the body mold, and means for causing the neck portion of the glass to assume the shape of the secondary neck mold after such substitution.

22. Apparatus for making blown glassware, comprising a receptacle for molten glass having a submerged downwardly opening discharge orifice, an annular member having its axis substantially in vertical alignment with the orifice and depending into the glass thereover for controlling the flow of glass through the orifice, a blow pipe having its axis disposed substantially in vertical alignment with the orifice and extending through said annular member, a rotatable carrier disposed adjacent to said orifice, means for rotating said carrier intermittently, a body mold mounted on said carrier and movable thereby through an orbital path a point on which is below and substantially in vertical alignment with the orifice, said point being one of the intermittent dwell positions of said body mold, a primary neck mold also mounted on said carrier and adapted to cooperate with said body mold, means effective to close said body mold and said primary neck mold while the carrier is stationary and the molds are positioned beneath said orifice, means for thereafter opening said molds independently, means for supplying blowing pressure through said blow pipe to blow a bubble of glass below and depending through said orifice and thereafter to expand the bubble of glass to the shape of said body mold and said primary neck mold after these molds are closed about the partly blown bubble, means for severing the glass in said molds from the glass depending through the orifice and for thereby sealing the top portion of the glass in the molds to form a completely closed hollow body of glass, the primary neck mold having an internal cavity including a substantially vertical annular wall portion contiguous with a substantially horizontal outwardly extending annular wall portion at the upper edge of the vertical portion, whereby the hollow body of glass in the mold will include a relatively thin portion overlying said substantially horizontal wall portion, a laterally and otherwise movable pick-off head for engaging and upwardly removing the upper sealing portion of the glass body in said molds, means for moving the pick-off head to cause it to follow said molds through at least a portion of their movement, means for moving the head downwardly into engagement with the upper sealing portion of glass above the primary neck mold, means for applying suction to the head for retaining the glass engaged thereby against the head, means for thereafter moving the head in a generally upwardly direction to raise the glass engaged thereby and to draw the glass connecting the engaged portion of glass with the glass in said molds down to a thin annular side wall, the thin side wall being formed from the glass of the body adjacent the shoulder formed by the vertical and horizontal wall portions, means for severing the glass engaged by the head from the glass in the molds at the thin wall section, the pick-off head and the severing means operating during the movement of the molds from their dwell position beneath the orifice to their next dwell position, means for causing the opening of the primary neck mold, a secondary neck mold having a larger and higher cavity than the primary neck mold and positioned adjacent to one of the dwell positions of the body mold subsequent to its position beneath the orifice, means for closing the secondary neck mold about the neck portion of the glass which has been reheated due to the removal of the primary neck mold from contact therewith, and means for causing the neck portion of the glass to conform to the shape of the secondary neck mold.

23. The method of making hollow blown glassware, that comprises directing fluid under pressure into the interior of a mass of molten glass to blow at least a portion of said mass into a bubble, enclosing the bubble of glass in a mold, blowing the bubble further to conform to the shape of the internal cavity of the mold, severing the hollow bubble of glass in the mold from the parent body of glass from which it is blown and thereby sealing the glass in the mold into a completely closed hollow body, thereafter engaging the portion of the glass which has been severed and which extends out of the neck portion of the mold and withdrawing such portion from the remainder of the glass in the mold to create a thinned annular wall of glass connecting the glass in the mold with the glass portion being withdrawn away from the mold, and severing the glass in the mold from that portion being withdrawn away from the mold at the thinned wall section, whereby to remove the bunched sealing portion of glass formed by the first mentioned severing operation.

24. The method of making hollow blown glassware, that comprises directing fluid under pressure into the interior of a mass of molten glass to blow at least a portion of said mass into a bubble, enclosing the bubble of glass in a mold, blowing the bubble further to conform to the shape of the internal cavity of the mold, severing the hollow bubble of glass in the mold from the parent body of glass from which it is blown and thereby sealing the glass in the mold into a completely closed hollow body, engaging the portion of the glass which has been severed and which extends out of the neck portion of the mold and withdrawing such portion from the remainder of the glass in the mold, whereby to create a thinned annular wall portion of glass connecting the glass in the mold with the glass portion being withdrawn away from the mold, and severing the glass being withdrawn from the mold from the remainder of the glass in the mold by the application of flame to the thinned wall portion, whereby the flame is effective to sever the glass at the thinned portion and also to cause the severed edge of the article in the mold to draw away from the line of severance due to the surface tension effect of the relatively fluid glass, and whereby at least partially to reheat the neck portion of the article within the mold.

25. The method of making hollow blown glassware, that comprises directing fluid under pressure into the interior of a mass of molten glass to blow at least a portion of said mass into a bubble, enclosing the bubble of glass in a mold, blowing the bubble further to conform to the shape of the internal cavity of the mold, severing the hollow bubble of glass in the mold from the parent body of glass from which it is blown and thereby sealing the glass in the mold into a completely closed hollow body, engaging the portion of the glass which has been severed and which extends out of the neck portion of the mold and withdrawing such portion from the remainder of the glass in the mold, whereby to create a thinned annular wall portion of glass connecting the glass in the mold with the glass portion being drawn away from the mold, severing the glass being withdrawn from the mold from the glass remaining in the mold at the thinned wall portion connecting them by the application of heat to this thinned portion to provide a neck opening into the interior of the hollow body of glass in the mold, and finishing the neck portion of the article as to the configuration of the top of the neck and the shape and size of the corkage by the application of a tool entering the neck and bearing against the top edge thereof and by relative rotation between this tool and the glass article in the mold.

26. The method of blowing hollow blown glassware, that comprises causing a mass of molten glass to issue from an orifice, directing fluid under pressure through said orifice into the interior of said mass and thereby imparting a hollow form to said mass, enclosing the hollow mass of glass in a mold, continuing the application of blowing pressure through the orifice to expand the hollow mass of glass to the shape of the mold, severing the hollow mass of glass in the mold from the glass depending through the orifice and thereby sealing at the top the mass of glass in the mold into a completely closed hollow body, engaging the top sealing portion of the hollow body of glass in the mold and moving this portion of glass away from the mold in a substantially vertical direction to provide a thinned annular wall connecting the glass being moved away from the mold with the glass remaining in the mold, severing the glass at the thinned wall section by the application of heat to this wall, and finishing the article of glass in the mold by the application of a neck forming tool to the upper neck portion thereof while simultaneously applying fluid pressure to the inside of the glass article in the mold to cause such glass to conform to the shape of the mold at all points and thus compensating for any collapsing of the article and shrinkage away from the mold walls due to contraction of the pressure fluid therein while the article existed as a completely closed hollow body of glass and was cooled by contact with the mold walls.

27. The method of making hollow blown glassware, which comprises causing a mass of molten glass to issue from an orifice, directing fluid under pressure through said orifice into the interior of said mass thereby imparting a hollow form to said mass, enclosing said hollow mass of glass in a mold at least a part of which is shaped to form a preliminary configuration to the corresponding part of the glass, applying fluid pressure through said orifice to expand the hollow mass of glass to the shape of the mold, severing the glass in the mold from the glass depending through the orifice and thereby sealing the glass in the mold into a closed hollow body, forming a neck opening into the interior of the hollow body of glass in the mold by engaging and upwardly moving the top sealing portion of the hollow body of glass to form a thinned annular wall connecting the portion of glass being removed from the remainder of the body of glass, severing the portion of glass being removed from the remaining portion of the glass body at the thinned annular wall thus formed, removing that portion of the mold which imparts the preliminary configuration to the corresponding portion of the glass therein, substituting therefor another mold having an internal cavity of the desired final configuration, and causing the glass to conform to the shape of the cavity of the substituted mold.

28. The method of making hollow blown glassware, which comprises causing a mass of molten glass to issue from an orifice, directing fluid under pressure through the orifice into the interior of the glass mass while it is still attached to the parent body of glass and thereby imparting a hollow form to the mass, enclosing the hollow mass of glass in a body mold and a primary neck mold, further applying fluid pressure to the interior of the mass of glass after it has been enclosed in the molds to expand the glass to conformity with the internal cavities of the molds, severing the glass in the molds from the parent body of glass and thereby sealing the glass in the molds into a completely closed hollow body, removing the upper sealing portion of glass and thus the marks of the severing means by engaging the upper sealing portion and moving it away from the molds, whereby this portion of glass is connected to the remainder of the glass in the molds by a thinned annular wall section, severing the glass being moved away from the molds from the glass in the molds at the thinned wall section by the application of flame thereto, the flame being effective also for evening the severed edge of the glass in the molds and for reheating the neck portion of the glass, removing the primary neck mold from about the glass and replacing it with a secondary neck mold the cavity of which is of the shape and size of the neck portion of the article to be formed, forcing the neck portion of the glass to conform to the shape of the internal cavity of the secondary neck mold by the action of a relatively rotating downwardly moving member engaging the top and inside of the neck portion of the glass article being formed, and supplying fluid pressure through the neck forming means during the finishing of the neck to force the body portion of the article into good heat transferring relation with the mold walls and thereby compensating for any shrinkage of the glass away from the mold walls.

GEORGE E. HOWARD.